US012662005B2

(12) United States Patent
Williams et al.

(10) Patent No.: US 12,662,005 B2
(45) Date of Patent: *Jun. 23, 2026

(54) AUTONOMOUS VEHICLE FOR TEMPORARILY POWERING ELECTRIC VEHICLES (EVs) ON THE ROAD

(71) Applicant: STATE FARM MUTUAL AUTOMOBILE INSURANCE COMPANY, Bloomington, IL (US)

(72) Inventors: Aaron Williams, Congerville, IL (US); Joseph Robert Brannan, Bloomington, IL (US); John Donovan, Bloomington, IL (US); Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/932,398

(22) Filed: Oct. 30, 2024

(65) Prior Publication Data

US 2025/0050752 A1 Feb. 13, 2025

Related U.S. Application Data

(63) Continuation of application No. 17/883,460, filed on Aug. 8, 2022, now Pat. No. 12,157,379.

(Continued)

(51) Int. Cl.
*H02J 50/80* (2016.01)
*B60L 53/126* (2019.01)
(Continued)

(52) U.S. Cl.
CPC ............. *B60L 53/126* (2019.02); *B60L 53/36* (2019.02); *B60L 53/38* (2019.02); *B60L 53/53* (2019.02);
(Continued)

(58) Field of Classification Search
CPC ........ B60L 53/126; B60L 53/30; B60L 53/34; B60L 53/35; B60L 53/36; B60L 53/38;
(Continued)

(56) References Cited

U.S. PATENT DOCUMENTS 9,616,763 B2 4/2017 Al-Awami et al.
9,684,037 B2 6/2017 Hardy et al.
(Continued)

FOREIGN PATENT DOCUMENTS

EP 3239686 A1 11/2017
EP 3578433 B1 8/2020
(Continued)

OTHER PUBLICATIONS

U.S. Appl. No. 17/883,447, filed Aug. 8, 2022.
(Continued)

*Primary Examiner* — Levi Gannon
(74) *Attorney, Agent, or Firm* — MARSHALL, GERSTEIN & BORUN LLP

(57) ABSTRACT

Methods and systems for charging an electric vehicle (EV) are described herein. An EV may require additional battery power to reach a charging station. A remote server in communication with the EV or an on-board computer or mobile device in the EV may obtain data to determine a location for the EV to meet a charging vehicle. The charging vehicle may be dispatched to meet the EV and deliver power to it, enabling the EV to reach a charging station or other destination. In some examples, the charging vehicle may deliver power to the EV while both vehicles are stationary. In other examples, the charging vehicle may couple to the EV while both vehicles are in motion.

20 Claims, 10 Drawing Sheets

Related U.S. Application Data

(60) Provisional application No. 63/388,404, filed on Jul. 12, 2022, provisional application No. 63/359,098, filed on Jul. 7, 2022.

(51) Int. Cl.

| | |
|---|---|
| *B60L 53/36* | (2019.01) |
| *B60L 53/38* | (2019.01) |
| *B60L 53/53* | (2019.01) |
| *B60L 53/57* | (2019.01) |
| *B60L 53/66* | (2019.01) |
| *B60L 53/68* | (2019.01) |
| *G01C 21/34* | (2006.01) |
| *H02J 50/90* | (2016.01) |

(52) U.S. Cl.
CPC .............. *B60L 53/57* (2019.02); *B60L 53/66* (2019.02); *B60L 53/68* (2019.02); *G01C 21/3438* (2013.01); *H02J 50/80* (2016.02); *H02J 50/90* (2016.02)

(58) Field of Classification Search
CPC .......... B60L 53/53; B60L 53/57; B60L 53/60; B60L 53/62; B60L 53/63; B60L 53/65; B60L 53/66; B60L 53/665; B60L 53/67; B60L 53/68; G01C 21/3438; G08G 1/202; G08G 1/205; H02J 50/10; H02J 50/12; H02J 50/80; H02J 50/90
See application file for complete search history.

(56) References Cited

U.S. PATENT DOCUMENTS

| | | | |
|---|---|---|---|
| 9,758,049 | B2 | 9/2017 | Sullivan et al. |
| 9,821,677 | B2 | 11/2017 | Kim |
| 9,830,748 | B2 | 11/2017 | Rosenbaum |
| 9,990,782 | B2 | 6/2018 | Rosenbaum |
| 10,011,181 | B2 | 7/2018 | Dudar et al. |
| 10,243,415 | B1 | 3/2019 | Grundmann et al. |
| 10,269,190 | B2 | 4/2019 | Rosenbaum |
| 10,369,893 | B2 | 8/2019 | Moghe et al. |
| 10,467,824 | B2 | 11/2019 | Rosenbaum |
| 10,493,855 | B2 | 12/2019 | Chase et al. |
| 10,562,406 | B2 | 2/2020 | Williams et al. |
| 10,723,230 | B2 | 7/2020 | Mastrandrea |
| 10,828,999 | B1 | 11/2020 | Konrardy et al. |
| 11,110,812 | B2 | 9/2021 | Miller |
| 11,227,452 | B2 | 1/2022 | Rosenbaum |
| 11,407,410 | B2 | 8/2022 | Rosenbaum |
| 11,515,741 | B2 | 11/2022 | Lu et al. |
| 11,524,707 | B2 | 12/2022 | Rosenbaum |
| 11,594,083 | B1 | 2/2023 | Rosenbaum |
| 2009/0212637 | A1 | 8/2009 | Baarman et al. |
| 2012/0056583 | A1 | 3/2012 | Gotz |
| 2012/0187916 | A1 | 7/2012 | Duer et al. |
| 2012/0303259 | A1 | 11/2012 | Prosser |
| 2013/0006677 | A1 | 1/2013 | Anglin et al. |
| 2013/0079962 | A1 | 3/2013 | Ishikawa et al. |
| 2014/0049213 | A1 | 2/2014 | Bianco |
| 2014/0278104 | A1 | 9/2014 | Proietty et al. |
| 2016/0052404 | A1 | 2/2016 | Enomoto |
| 2016/0129793 | A1 | 5/2016 | Cronie |
| 2017/0136881 | A1 | 5/2017 | Ricci |
| 2017/0146354 | A1 | 5/2017 | Boss et al. |
| 2020/0262305 | A1 | 8/2020 | Chakraborty et al. |
| 2020/0282857 | A1 | 9/2020 | Mortensen et al. |
| 2020/0317067 | A1 | 10/2020 | Miller |
| 2020/0341472 | A1 | 10/2020 | Zenner et al. |
| 2021/0231450 | A1 | 7/2021 | Pedersen |
| 2021/0394879 | A1 | 12/2021 | Coughlan et al. |
| 2022/0092893 | A1 | 3/2022 | Rosenbaum |
| 2022/0340148 | A1 | 10/2022 | Rosenbaum |
| 2023/0060300 | A1 | 3/2023 | Rosenbaum |
| 2023/0302926 | A1* | 9/2023 | Lee ...................... B60L 3/0015 |
| 2023/0311688 | A1 | 10/2023 | Perumalla et al. |
| 2024/0010081 | A1 | 1/2024 | Williams et al. |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |

OTHER PUBLICATIONS

U.S. Appl. No. 17/883,460, Nonfinal Office Action, dated Dec. 18, 2023.

U.S. Appl. No. 17/883,460, Final Office Action, dated Feb. 28, 2024.

U.S. Appl. No. 17/883,460, Nonfinal Office Action, dated May 9, 2024.

U.S. Appl. No. 17/883,460, Notice of Allowance, dated Jul. 31, 2024.

* cited by examiner

400

410A

410B

410C

420C

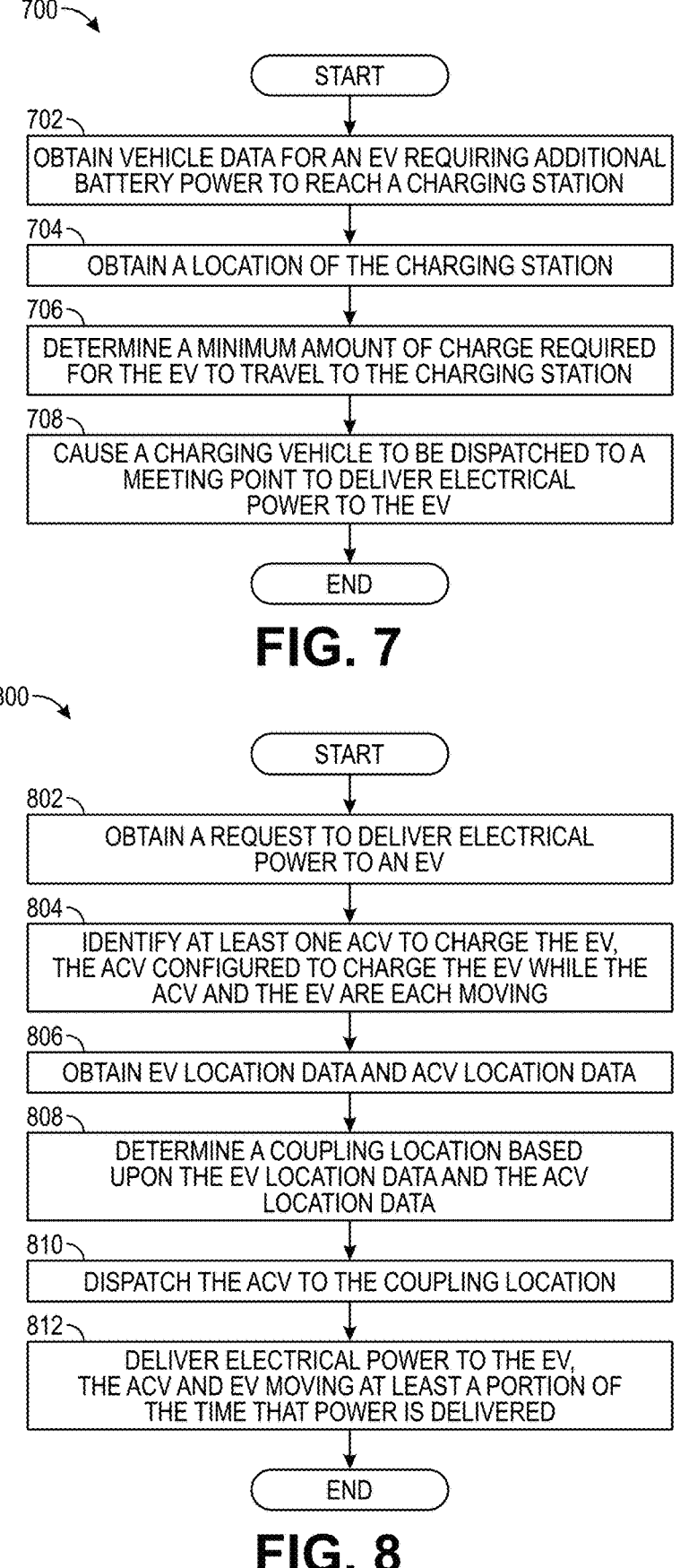

700

START

702 — OBTAIN VEHICLE DATA FOR AN EV REQUIRING ADDITIONAL BATTERY POWER TO REACH A CHARGING STATION

704 — OBTAIN A LOCATION OF THE CHARGING STATION

706 — DETERMINE A MINIMUM AMOUNT OF CHARGE REQUIRED FOR THE EV TO TRAVEL TO THE CHARGING STATION

708 — CAUSE A CHARGING VEHICLE TO BE DISPATCHED TO A MEETING POINT TO DELIVER ELECTRICAL POWER TO THE EV

END

START

802 — OBTAIN A REQUEST TO DELIVER ELECTRICAL POWER TO AN EV

804 — IDENTIFY AT LEAST ONE ACV TO CHARGE THE EV, THE ACV CONFIGURED TO CHARGE THE EV WHILE THE ACV AND THE EV ARE EACH MOVING

806 — OBTAIN EV LOCATION DATA AND ACV LOCATION DATA

808 — DETERMINE A COUPLING LOCATION BASED UPON THE EV LOCATION DATA AND THE ACV LOCATION DATA

810 — DISPATCH THE ACV TO THE COUPLING LOCATION

812 — DELIVER ELECTRICAL POWER TO THE EV, THE ACV AND EV MOVING AT LEAST A PORTION OF THE TIME THAT POWER IS DELIVERED

END

FIG. 8

AUTONOMOUS VEHICLE FOR TEMPORARILY POWERING ELECTRIC VEHICLES (EVs) ON THE ROAD

CROSS-REFERENCE TO RELATED APPLICATIONS

This application is a continuation of U.S. patent application Ser. No. 17/883,460 entitled "Autonomous Vehicle for Temporarily Powering Electric Vehicles (EVs) on the Road," filed on Aug. 8, 2022, which claims priority to and the benefit of the filing date of (1) provisional U.S. Patent Application No. 63/359,098 entitled "Recharge System for Electric Vehicle (EV) Without Immediate Access to Permanent Charging Station," filed on Jul. 7, 2022; and (2) provisional U.S. Patent Application No. 63/388,404 entitled "Recharge System for Electric Vehicle (EV) Without Immediate Access to Permanent Charging Station," filed on Jul. 12, 2022. The entire contents of each of which is hereby expressly incorporated herein by reference.

FIELD

The present disclosure generally relates to systems and methods for charging an electric vehicle (EV), and more specifically, to charging an EV without the use of stationary charging stations.

BACKGROUND

Electric Vehicles (EVs) may require recharging to continue driving when they are at a low battery power (e.g., state of charge). When an EV is running out of battery power and does not have enough range to reach the nearest fueling and/or charging station, the EV may need roadside services, such as a tow truck to tow the EV to a nearby fueling and/or charging station. However, conventional techniques of dispatching a tow truck to tow the EV to a charging station may result in significant delays. For example, tow trucks may have limited resources and may be unable to travel to the EV's location for a long time. Further, EV occupants may be required, for example, to wait for: (1) a tow truck to arrive, (2) the tow truck to tow the EV to a charging station, and (3) the EV to sufficiently recharge at the charging station.

Such delays may result in inconvenience or hardship for EV occupants, with depleted battery power rendering their EV unable to transport them to important engagements or other desired destinations. Further, this may be dangerous for drivers and/or passengers waiting for a tow truck to arrive, particularly when there are extreme weather conditions outside of the vehicle, such as heavy rain, snow, or very low temperatures. Conventional techniques may include additional inconveniences, inefficiencies, or drawbacks as well.

BRIEF SUMMARY

A tow vehicle (such as a roaming Autonomous Charging Vehicle (ACV)) may provide a small charge to an Electric Vehicle (EV) to give the EV enough range to drive to the nearest charging station (or other destination). The tow vehicle may calculate the amount of charge needed for the EV to travel to the nearest charging station based upon battery degradation, battery performance data, weather, weight, load weight (e.g., Amazon or UPS delivery vehicle with fluctuating load, or semi-truck with trailer having variable loads), etc. to determine the minimum amount of power necessary to provide enough fuel/charge for the EV to reach the nearest charging station.

For instance, the EV may transmit battery level and performance data, and weight of load(s)/packages to the ACV via V2V to allow the ACV to determine/calculate an appropriate charge (e.g., calculate charge amount and/or time) needed to allow the EV to travel to a charging station along the EV's route.

An Autonomous Charging Vehicle (ACV) may pull up behind an EV as its driving and charge the EV without stopping, such as wirelessly or physically connecting to the EV to supply charge without towing it. The EV may provide its destination to the ACV (e.g., via V2V wireless communication) so that the ACV knows the EV's route/destination and which roads to travel as it is following the EV. The ACV may be called preemptively when the EV unexpectedly runs low on power (e.g., battery nearing end-of-life with degrading performance), and will not be able to reach a nearby charging station before running out of power.

In some aspects, the ACV may use a magnet system to connect behind the EV and supply charge. The ACV may also be a drone and connect on top of the EV and supply a temporary or limited charge.

The present embodiments may be related to, inter alia, electric vehicles and/or autonomous or semi-autonomous vehicle operation, including driverless operation of fully autonomous vehicles. The embodiments described herein relate particularly to various aspects of communication between autonomous operation features, components, and software. Specific systems and methods are summarized below. The methods and systems summarized below may include additional, less, or alternate actions, including those discussed elsewhere herein.

In one aspect, a computer-implemented method for charging an electric vehicle (EV) may be provided. The method may be implemented via one or more local or remote processors, servers, sensors, transceivers, virtual reality headsets, mobile devices, and/or other electrical or electronic components. For instance, the method may include (1) obtaining, by one or more processors, vehicle data for an EV requiring additional battery power to reach a charging station, the vehicle data including (i) a charge status for the EV, (ii) location data of the EV, and/or (iii) one or more of (A) battery performance data of the EV, (B) weight data of the EV, and/or (C) driving behavior data of the EV; (2) obtaining, by one or more processors, a location of the charging station; (3) determining, by the one or more processors, a minimum amount of charge required for the EV to travel to the charging station based upon the location of the charging station and the vehicle data; and/or (4) causing, by the one or more processors, a charging vehicle to be dispatched to a meeting point to deliver electrical power to the EV until the EV has at least the minimum amount of charge to reach the charging station. The method may include additional, less, or alternate actions and functionality, including that discussed elsewhere herein.

In some embodiments, the method may further include (1) causing, by the one or more processors, an indication to be displayed to a vehicle occupant of the EV of a low battery warning; and/or (2) causing, by the one or more processors, a prompt to be displayed to the vehicle occupant requesting input from the vehicle occupant of whether the charging vehicle should be dispatched.

Also in some embodiments, the method may further include selecting, by the one or more processors, the charging station, from a plurality of charging stations, based upon the location data, a station type of each of the plurality of charging stations, and a location of each of the plurality of charging stations, wherein the location data includes both a current location of the EV and a route of the EV.

In further embodiments, the method may further include (1) obtaining, by the one or more processors, a current location for each of a plurality of charging vehicles; and/or (2) selecting, by the one or more processors, the charging vehicle, from the plurality of charging vehicles, based upon the location data of the EV and the current locations of each of the plurality of charging vehicles.

In certain embodiments, the method may further include determining, by the one or more processors, the meeting point based upon the location data of the EV and the current location of the charging vehicle. Additionally or alternatively, the method may further include (1) determining, by the one or more processors, an estimated time of arrival (ETA) for the EV at a destination included in the location data, based upon an expected amount of time for (i) the charging vehicle to deliver, to the EV, the electrical power until the EV has at least the minimum amount of charge and for (ii) the charging station to deliver, to the EV, an additional amount of charge; and/or (2) causing, by the one or more processors, an indication of the ETA to be displayed to a vehicle occupant of the EV.

In some embodiments, the one or more processors may be included in the charging vehicle and the location of the charging station and the vehicle data are obtained by the one or more processors using vehicle-to-vehicle communication between the EV and the charging vehicle. The vehicle data may further include weather data corresponding to the location data. And in certain embodiments, (1) the charging vehicle may be a tow truck; and/or (2) the charging vehicle delivers electric power to the EV while towing the EV.

Systems or computer-readable media storing instructions for implementing all or part of the method described above may also be provided in some aspects. Systems for implementing such methods may include one or more of the following: a special-purpose assessment computing device, a mobile computing device (mobile device), a personal electronic device, an on-board computer, a remote server, one or more sensors, one or more communication modules configured to communicate wirelessly via radio links, radio frequency links, and/or wireless communication channels, and/or one or more program memories coupled to one or more processors of the mobile computing device, personal electronic device, on-board computer, or remote server. Such program memories may store instructions to cause the one or more processors to implement part or all of the method described above. Additional or alternative features described herein below may be included in some aspects.

In another aspect, a computer-implemented method for charging an EV during a trip of the EV may be provided. The method may be implemented via one or more local or remote processors, servers, sensors, transceivers, virtual reality headsets, mobile devices, and/or other electrical or electronic components. For instance, the method may include (1) obtaining, by one or more processors, a request to deliver electrical power to the EV; (2) identifying, by the one or more processors, at least one autonomous charging vehicle (ACV) to charge the EV, wherein the ACV is configured to charge the EV while the EV and the ACV are each moving; (3) obtaining, by the one or more processors, EV location data and ACV location data; (4) determining, by the one or more processors, a coupling location based upon the EV location data and the ACV location data; (5) dispatching, by the one or more processors, the ACV to the coupling location; and/or (6) causing, by the one or more processors, the ACV to deliver the electrical power to the EV for a threshold charging period, wherein the ACV and the EV are each moving during at least a portion of the threshold charging period. The method may include additional, less, or alternate actions and functionality, including that discussed elsewhere herein.

For instance, in some embodiments the method may further include (1) obtaining, by the one or more processors, battery data of the EV, wherein the battery data includes at least a charge level of the EV; (2) determining, by the one or more processors, a minimum charge level required for the EV to travel to a target location based upon the EV location data and the battery data, wherein the target location is a charging station or a destination; (3) determining, by the one or more processors, that the charge level of the EV is less than the minimum charge level; and/or (4) dispatching, by the one or more processors, the ACV in response to determining that the charge level of the EV is less than the minimum charge level.

Also in some embodiments, the method may further include causing, by the one or more processors, a prompt to be displayed to a vehicle occupant requesting input from the vehicle occupant regarding whether to dispatch the ACV. Additionally or alternatively, the ACV may be dispatched automatically, and/or the ACV may deliver the electrical power to the EV wirelessly. In some embodiments, the ACV may be configured to deliver the electrical power to the EV using a magnet system.

In some embodiments, the one or more processors may be included in the ACV and the EV location data may be obtained by the one or more processors using vehicle-to-vehicle communication between the EV and the ACV. In further embodiments, the ACV may be a drone, and/or (1) the ACV may be a tow truck; and/or (2) the ACV may deliver electrical power to the EV while towing the EV.

Systems or computer-readable media storing instructions for implementing all or part of the method described above may also be provided in some aspects. Systems for implementing such methods may include one or more of the following: a special-purpose assessment computing device, a mobile computing device (mobile device), a personal electronic device, an on-board computer, a remote server, one or more sensors, one or more communication modules configured to communicate wirelessly via radio links, radio frequency links, and/or wireless communication channels, and/or one or more program memories coupled to one or more processors of the mobile computing device, personal electronic device, on-board computer, or remote server. Such program memories may store instructions to cause the one or more processors to implement part or all of the method described above. Additional or alternative features described herein below may be included in some aspects.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 7 illustrates a flow diagram of an exemplary computer-implemented method for charging an EV until the EV has enough battery power to reach a charging station; and FIG. 8 illustrates a flow diagram of an exemplary computer-implemented method for charging an EV during as the EV is traveling.

Figure 1A:
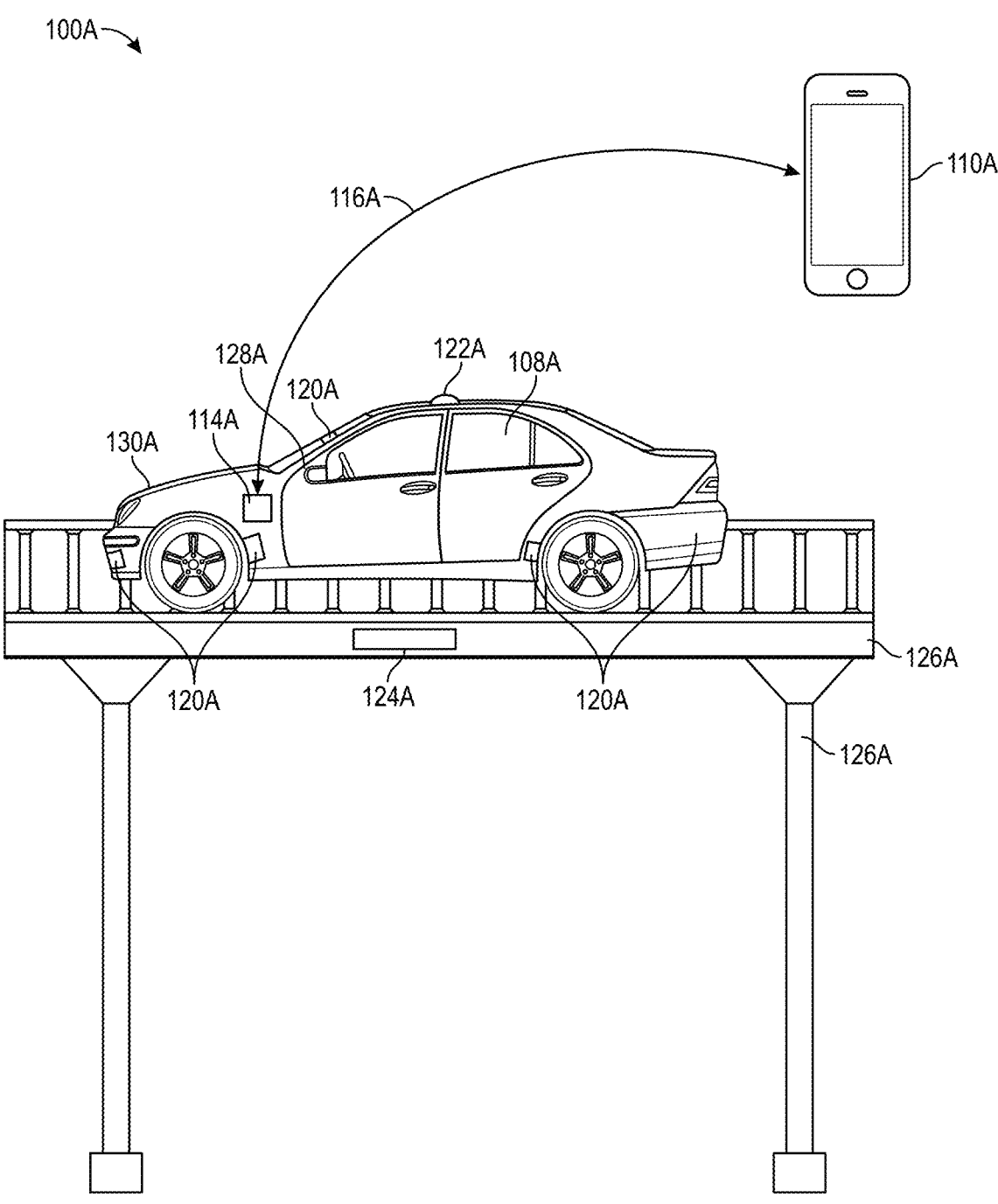
FIG. 1A illustrates a block diagram of an exemplary EV data system for EV operation, monitoring, communication, and/or related functions.

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples. Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

The systems and methods disclosed herein are generally related to, inter alia, various aspects of electric vehicles and utilizing fuel and/or battery power within an electric vehicle to power components within the electric vehicle, such as the motor, engine, steering control, brakes, vehicle sensors, lighting, heating system, cooling system, in-vehicle infotainment system, windshield wipers, etc. The electric vehicles described herein may include fully electric vehicles powered solely by a battery or hybrid vehicles powered by a combination of a battery and fuel, such as gasoline or fuel cells. The electric vehicles described herein may also include solar electric vehicles, such as electric vehicles having solar panels, where the electric vehicles receive at least some of their power from the solar panels. The solar electric vehicles may be powered by a combination of a battery and solar panels, or a combination of a battery, solar panels, and a fuel cell.

The systems and methods disclosed herein also generally relate to various aspects of communication between autonomous operation features, components, and software. The autonomous operation features may take full control of the vehicle under certain conditions, viz. fully autonomous operation, or the autonomous operation features may assist the vehicle operator in operating the vehicle, viz. partially autonomous operation. Fully autonomous operation features may include systems within the vehicle that pilot the vehicle to a destination with or without a vehicle operator present (e.g., an operating system for a driverless car). Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation. The electric vehicles described herein may be fully autonomous, partially autonomous, manually operated, or any suitable combination of these.

Autonomous operation features utilize data not available to a human operator, respond to conditions in the vehicle operating environment faster than human operators, and do not suffer fatigue or distraction. Thus, the autonomous operation features may also significantly affect various risks associated with operating a vehicle.

As used herein, the term "dispatch" should be understood to include a scenario where a remote entity instructs a vehicle to travel to a location or a scenario where the vehicle instructs itself to travel to the location. For example, if a given vehicle is dispatched, the given vehicle may have been dispatched (e.g., instructed to travel to a location) by a server, or the given vehicle may dispatch itself (e.g., via self-driving technologies, or by an operator of the given vehicle) to the location.

The data discussed herein, such as the data associated with the EV, EV battery, battery performance, and estimated remaining life, may be stored and/or used for additional purposes, such as providing insurance quotes, insurance discounts, vehicle loan information or quotes, auto insurance information, and/or EV and EV battery maintenance or care recommendations to the EV owner or prospective owner. In certain embodiments, payment data associated with paying for a tow truck and/or electric charge may be generated and/or saved. The payment data may be generated via mobile devices or the EVs, and the payment data may be transferred to the tow truck via V2V (Vehicle-to-Vehicle) wireless communication. Additionally or alternatively, the data discussed herein (such as EV-related, battery-related, and payment-related data) may be stored and/or accessible via one or more blockchains or distributed ledgers.

Exemplary Electric Vehicle Operation System

FIG. 1A illustrates a block diagram of an exemplary EV data system 100A on which the exemplary computer-implemented methods described herein may be implemented. The high-level architecture includes both hardware and software applications, as well as various data communications channels for communicating data between the various hardware and software components. The EV data system 100A may obtain information regarding an EV 108A (e.g., an electric car, truck, motorcycle, etc.) and the surrounding environment. An on-board computer 114A may utilize this information to operate the EV 108A according to an autonomous operation feature or to assist the vehicle operator in operating the EV 108A. To monitor the EV 108A, the EV 108A may include one or more sensors 120A installed within the EV 108A and/or personal electronic devices that may communicate with the on-board computer 114A. The sensor data may be processed using the on-board computer 114A or a mobile device 110A (e.g., a smart phone, a tablet computer, a special purpose computing device, smart watch, wearable electronics, smart glasses, augmented reality (AR) glasses, virtual reality (VR) headset, etc.) to determine when the EV 108A is in operation and information regarding the vehicle.

One or more on-board computers 114A may be permanently or removably installed in the EV 108A. The on-board computer 114A may interface with the one or more sensors 120A within the vehicle 108A (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114A.

The EV 108A may be powered by a battery 130A which supplies power to the electrical components within the EV 108A, such as the motor, engine, steering control, brakes, vehicle sensors, lighting, heating system 128A, cooling system, in-vehicle infotainment system, windshield wipers, etc. The battery 130A may include a charge level sensor to detect the amount of charge remaining in the battery 130A. The heating system 128A may provide heat to the interior of the EV 108A for example, via a heat pump to heat the interior of the EV 108A to a desired temperature.

The battery 130A may be electrically coupled to the components within the EV 108A, for example via wired connection. Additionally, the EV 108A may include switches for turning the power to each of the electrical components on and off, so that the battery 130A can supply power to some electrical components within the EV 108A without supplying power to other electrical components.

The battery 130A may be configured to be charged via a charge port (e.g., the SAE J1772 connector) with compatibility with one or more voltages (e.g., 120 volts, 220 volts, 240 volts, etc.), AC and/or DC charging, and one or more charging standards (e.g., Tesla, CHAdeMO, CCS, etc.). The battery 130A in addition or in alternative to being configured to be charged via a charging port, may be configured to be charged via wireless charging such as inductive charging, radio charging, or resonance charging, which for example, may use the Qi protocol or other suitable wireless charging protocols.

The EV 108A may further include a communication component 122A to transmit information to and receive information from external sources, including other vehicles, infrastructure, emergency services, etc. In some embodiments, the mobile device 110A may supplement the functions performed by the on-board computer 114A described herein by, for example, sending or receiving information to and from an emergency services provider via a network, such as over one or more radio frequency links or wireless communication channels. In other embodiments, the on-board computer 114A may perform all of the functions of the mobile device 110A described herein, in which case no mobile device 110A may be present in the system 100A. Additionally, the mobile device 110A and on-board computer 114A may communicate with one another directly over link 116A.

The mobile device 110A may be either a general-use personal computer, cellular phone, smart phone, tablet computer, smart watch, wearable electronics, or a dedicated vehicle monitoring or control device. Although only one mobile device 110A is illustrated, it should be understood that a plurality of mobile devices 110A may be used in some embodiments. The on-board computer 114A may be a general-use on-board computer capable of performing many functions relating to vehicle operation or a dedicated computer for autonomous vehicle operation. Further, the on-board computer 114A may be installed by the manufacturer of the EV 108A or as an aftermarket modification or addition to the EV 108A. In some embodiments or under certain conditions, the mobile device 110A or on-board computer 114A may function as thin-client devices that outsource some or most of the processing to a server.

The sensors 120A may be removably or fixedly installed within the EV 108A and may be disposed in various arrangements to provide information to the EV 108A for operation. Among the sensors 120A may be included one or more of a GPS unit, a radar unit, a LIDAR unit, an ultrasonic sensor, an infrared sensor, an inductance sensor, a camera, an accelerometer, a tachometer, a speedometer, an outdoor temperature sensor for sensing the temperature outside of the EV, and/or an in-cabin temperature sensor for sensing the temperature within the EV 108A.

Some of the sensors 120A (e.g., radar, LIDAR, or camera units) may actively or passively scan the vehicle environment for obstacles (e.g., other vehicles, buildings, pedestrians, etc.), roadways, lane markings, signs, or signals. Other sensors 120A (e.g., GPS, accelerometer, or tachometer units) may provide data for determining the location or movement of the EV 108A. Still other sensors 120A may be directed to the interior or passenger compartment of the EV 108A, such as cameras, microphones, pressure sensors, thermometers, or similar sensors to monitor the vehicle operator and/or passengers within the EV 108A. Information generated or received by the sensors 120A may be communicated to the on-board computer 114A or the mobile device 110A for use in vehicle operation.

In further embodiments, an infrastructure communication device 124A may be included for monitoring the status of one or more infrastructure components 126A. Infrastructure components 126A may include roadways, bridges, traffic signals, gates, switches, crossings, parking lots or garages, toll booths, docks, hangars, or other similar physical portions of a transportation system's infrastructure. The infrastructure communication device 124A may include or be communicatively connected to one or more sensors (not shown) for detecting information relating to the condition of the infrastructure component 126A. The sensors (not shown) may generate data relating to weather conditions, traffic conditions, or operating status of the infrastructure component 126A.

The infrastructure communication device 124A may be configured to receive the sensor data generated and determine a condition of the infrastructure component 126A, such as weather conditions, road integrity, construction, traffic, available parking spaces, etc. The infrastructure communication device 124A may further be configured to communicate information to vehicles, such as the EV 108A via the communication component 122A. In some embodiments, the infrastructure communication device 124A may receive information from one or more vehicles, while, in other embodiments, the infrastructure communication device 124A may only transmit information to the vehicles. The infrastructure communication device 124A may be configured to monitor vehicles and/or communicate information to other vehicles and/or to mobile devices 110A.

In some embodiments, the communication component 122A may receive information from external sources, such as other vehicles or infrastructure. The communication component 122A may also send information regarding the EV 108A to external sources. To send and receive information, the communication component 122A may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120A to implement the autonomous operation features. For example, the communication component 122A may receive information that an autonomous vehicle ahead of the EV 108A is reducing speed, allowing the adjustments in the autonomous operation of the vehicle EV.

In addition to receiving information from the sensors 120A, the on-board computer 114A may directly or indirectly control the operation of the EV 108A according to various autonomous operation features. The autonomous operation features may include software applications or modules implemented by the on-board computer 114A to generate and implement control commands to control the steering, braking, or throttle of the EV 108A. To facilitate such control, the on-board computer 114A may be communicatively connected to control components of the EV 108A by various electrical or electromechanical control components (not shown). When a control command is generated by the on-board computer 114A, it may thus be communicated to the control components of the EV 108A to effect a control action. In embodiments involving fully autonomous vehicles, the EV 108A may be operable only through such control components (not shown). In other embodiments, the control components may be disposed within or supplement other vehicle operator control components (not shown), such as steering wheels, accelerator or brake pedals, or ignition switches.

Although the EV data system 100A is shown to include one EV 108A, one mobile device 110A, and one on-board computer 114A, it should be understood that different numbers of EVs 108A, mobile devices 110A, and/or on-board computers 114A may be utilized. For example, the system 100A may include hundreds or thousands of mobile devices 110A or on-board computers 114A, all of which may be interconnected via the network.

Exemplary Electric Vehicle Communication System

Figure 1B:
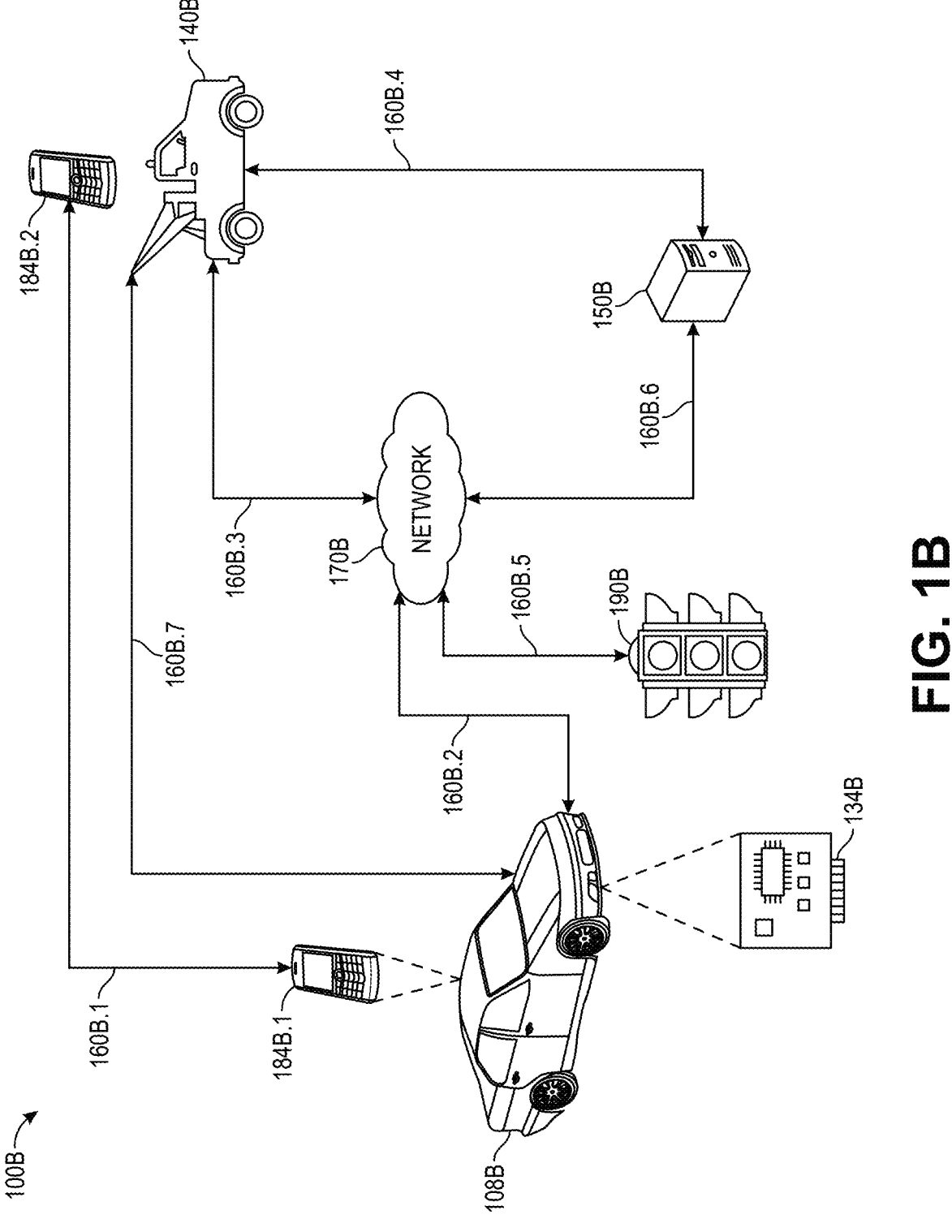
FIG. 1B illustrates a block diagram of an exemplary EV communication system, showing an EV and a charging vehicle.

FIG. 1B illustrates a block diagram of an exemplary EV communication system the 100B on which the exemplary computer-implemented methods described herein may be implemented. In one aspect, system the 100B may include a network 170B, a vehicle 108B and N number of respective mobile computing devices 184B.1-184B.N, one or several personal electronic devices (not shown), a remote server 150B, and/or a smart infrastructure component 190B. In one aspect, mobile computing devices 184B may be an implementation of mobile computing device 110A, while vehicle 108B may be an implementation of EV 108A. The vehicle 108B may be a vehicle 108A having autonomous operation features, or a vehicle 108A not having autonomous operation features. The vehicle 108B may be an electric vehicle with a battery and corresponding battery configurations (e.g., charging capabilities) that may be the same as or similar to the battery configurations of the vehicle 108A.

As illustrated, the vehicle 108B may include a vehicle controller 134B, which may be an on-board computer 114A as discussed elsewhere herein, while charging vehicle 140B may lack such a component. Electric vehicles 108B and charging vehicles 140B may be configured for wireless inter-vehicle communication, such as vehicle-to-vehicle (V2V) wireless communication and/or data transmission via the communication component 122A, directly via the mobile computing devices 184B, or otherwise.

The personal electronic devices may include any type of electronic device that monitors conditions associated with an individual. For example, the personal electronic device may be a smart watch, a fitness tracker, a personal medical device (e.g., a pacemaker, an insulin pump, etc.) and/or monitoring devices thereof, smart implants, and so on. The personal electronic device may monitor the conditions of the individual while the individual is present in a vehicle 108B and/or operating a vehicle 108B in a semi-autonomous mode.

Although the system 100B is shown in FIG. 1B as including one network 170B, two mobile computing devices 184B.1 and 184B.2, an electric vehicle 108B, a charging vehicle 140B, one remote server 150B, and/or one smart infrastructure component 190B, various embodiments of the system 100B may include any suitable number of networks 170B, mobile computing devices 184B, electric vehicles 108B, charging vehicles 140B, remote servers 150B, and/or infrastructure components 190B. The vehicles 108B included in such embodiments may include any number of vehicles 108B having vehicle controllers and not having vehicles controllers 134B. Moreover, the system 100B may include a plurality of remote servers 150B and more than two mobile computing devices 134B, any suitable number of which being interconnected directly to one another and/or via network 170B.

In one aspect, each of mobile computing devices 184B.1 and 184B.2 may be configured to communicate with one another directly via peer-to-peer (P2P) wireless communication and/or data transfer. In other aspects, each of mobile computing devices 184B.1 and 184B.2 may be configured to communicate indirectly with one another and/or any suitable device via communications over network 170B, such as remote server 150B and/or smart infrastructure component 190B, for example. In still other aspects, each of mobile computing devices 184B.1 and 184B.2 may be configured to communicate directly and/or indirectly with other suitable devices, which may include synchronous or asynchronous communication.

Each of mobile computing devices 184B.1 and 184B.2 and/or personal electronic devices may be configured to send data to and/or receive data from one another and/or via network 170B using one or more suitable communication protocols, which may be the same communication protocols or different communication protocols. For example, mobile computing devices 184B.1 and 184B.2 may be configured to communicate with one another via a direct radio link 160B.1, which may utilize, for example, a Wi-Fi direct protocol, an ad-hoc cellular communication protocol, etc.

One or more components of the system 100B (e.g., the computing devices 184.1B and 184.2B and/or personal electronic devices) may be configured to communicate with one another via radio links 160B.1-160B.7. The mobile computing devices 184.1B and 184.2B may be configured to communicate with each other via the radio link 160B.1. Still further, one or more of mobile computing devices 184.1B and/or 184.2B and/or personal electronic devices may also be configured to communicate with one or more smart infrastructure components 190B and/or indirectly (e.g., via radio links 160B.5 via network 170B) using any suitable communication protocols.

Similarly, one or more vehicle controllers 134B may be configured to communicate directly to the network 130 (via radio link 160B.2) or indirectly through mobile computing device 184.1B (via radio link 160B.2). Vehicle controllers 134B may also communicate with other vehicle controllers and/or mobile computing devices 184.2B directly or indirectly through mobile computing device 184B.1 via local radio links 160B.1. Vehicle to vehicle (V2V) communication may be possible between the vehicles 108B and 140B (e.g., via the radio link 160B.7).

As discussed elsewhere herein, network 170B may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 160B.1-160B.7 may represent wired links, wireless links, or any suitable combination thereof.

Mobile computing devices 184B.1 and 184B.2 and/or personal electronic devices may also be configured to communicate with vehicles 108B and 140B, respectively, utilizing a BLUETOOTH communication protocol (radio link not shown). In some embodiments, this may include communication between a mobile computing device 184B.1 and a vehicle controller 134B. In other embodiments, it may involve communication between a mobile computing device 184B.2 and a vehicle telephony, entertainment, navigation, or information system (not shown) of the charging vehicle 140B that provides functionality other than autonomous (or semi-autonomous) vehicle control. Thus, charging vehicles 140B without autonomous operation features may nonetheless be connected to mobile computing devices 184B.2 in order to facilitate communication, information presentation, or similar non-control operations (e.g., navigation display, hands-free telephony, or music selection and presentation).

To provide additional examples, mobile computing devices 184B.1 and 184B.2 and/or personal electronic devices may be configured to communicate with one another via radio links 160B.2 and 160B.3 by each communicating with network 170B utilizing a cellular communication protocol. Still further, one or more of mobile computing devices 184B.1 and/or 184B.2 and/or personal electronic devices may also be configured to communicate with one or more smart infrastructure components 190B directly (e.g., via radio link 160B.8) and/or indirectly (e.g., via radio links 160B.3 and 160B.5 via network 170B) using any suitable communication protocols. Similarly, one or more vehicle controllers 134B may be configured to communicate directly to the network 170B (via radio link 160B.2) or indirectly through mobile computing device 184B.1 (via radio link 160B.2). Vehicle controllers 134B may also communicate with other vehicle controllers and/or mobile computing devices 184B.2 directly or indirectly through mobile computing device 184B.1 via local radio links 160B.1.

As discussed elsewhere herein, network 170B may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 160B.1-160B.8 may represent wired links, wireless links, or any suitable combination thereof. For example, the link 160B.5 may include wired links to the network 170B, in addition to, or instead of, wireless radio connections.

Charging vehicle 140B may be a tow truck, a car, a drone, or other device for providing temporary charge to the EV 108A so that the EV 108A has enough charge to reach the nearest charging station, or any other suitable vehicle or device for assisting the EV 108A when the EV 108A is unable to travel to the nearest charging and/or fueling station. The charging vehicle 140B may have similar features and/or functionality as the EV 108A. In some implementations, the charging vehicle 140B may have a larger battery with more battery capacity than the EV 108A and/or may include an additional battery, such as a battery attached to the exterior of the vehicle (e.g., the roof) for further charging.

In some embodiments, when the amount of charge remaining in the EV 108A is less than a threshold amount of charge, the distance to the nearest charging and/or fueling station is greater than a threshold distance, or any suitable combination of these, the EV 108A automatically transmits a notification to the charging vehicle 140B and/or the remote server 150B requesting charging services and/or indicating the location of the EV 108A.

In other embodiments, the on-board computer 114A continuously or periodically determines a shutdown risk for the EV 108A based on the amount of charge remaining in the EV 108A and/or the distance to the nearest charging and/or fueling station. For example, when both the amount of charge remaining is low and the distance to the nearest charging and/or fueling station is high, the on-board computer 114A may determine a high level of shutdown risk. On the other hand, when the amount of charge remaining is low, but the distance to the nearest charging and/or fueling station is also low, the on-board computer 114A may determine a medium or low level of shutdown risk. The shutdown risk may be a score for example, on a scale of 1-100 based upon the percentage of charge remaining in the battery and the distance to the nearest charging and/or fueling station. If the shutdown risk satisfies a threshold, the vehicle 108B may request services.

In other implementations, the on-board computer 114A or mobile device 184B.1 may include user controls for a user, such as a driver or passenger to transmit the notification to the charging vehicle 140B and/or the remote server 150B requesting charging services when the user determines that the amount of charge remaining in the EV 108A is too low to reach the nearest charging and/or fueling station.

The remote server 150B and/or the charging vehicle 140B may respond to the notification with a response message to the EV 108A indicating that the charging vehicle 140B has been dispatched to meet the EV 108A and/or indicating an expected time for the charging vehicle to arrive.

Additionally, the mobile computing devices 184B.1 and 184B.2 may be configured to execute one or more algorithms, programs, applications, etc., to (i) determine a geographic location of each respective mobile computing device (and thus their associated vehicle); (ii) to generate, measure, monitor, and/or collect one or more sensor metrics as telematics data; (iii) to broadcast the geographic data and/or telematics data via their respective radio links; (iv) to receive the geographic data and/or telematics data via their respective radio links; (v) to determine whether an alert should be generated based upon the telematics data and/or the geographic location data, to generate the one or more alerts; and/or (vi) to broadcast one or more alert notifications. Such functionality may, in some embodiments be controlled in whole or part by a Data Application operating on the mobile computing devices 184B, as discussed elsewhere herein. Such Data Application may communicate between the mobile computing devices 184B and one or more external computing devices 150B to facilitate centralized data collection and/or processing.

In some embodiments, the Data Application may facilitate control of an electric vehicle 108B by a user, such as by selecting vehicle destinations and/or routes along which the electric vehicle 108B will travel. The Data Application may further be used to establish restrictions on vehicle use or store user preferences for vehicle use, such as in a user profile. In further embodiments, the Data Application may monitor vehicle operation or sensor data in real-time to make recommendations or for other purposes as described herein. The Data Application may further facilitate monitoring and/or assessment of the electric vehicle 108B, such as by evaluating operating data to determine the condition of the vehicle or components thereof (e.g., sensors, autonomous operation features, etc.).

In some embodiments, the smart infrastructure component 190B may include or be communicatively connected to one or more sensors (not shown) for detecting information relating to the condition of the smart infrastructure component 190B, which sensors may be connected to or part of the infrastructure communication device 124A of the smart infrastructure component 190B. The sensors (not shown) may generate data relating to weather conditions, traffic conditions, or operating status of the smart infrastructure component 190B. The smart infrastructure component 190B may be configured to receive the sensor data generated and determine a condition of the smart infrastructure component 190B, such as weather conditions, road integrity, construction, traffic, available parking spaces, etc.

In some aspects, smart infrastructure component 190B may be configured to communicate with one or more other devices directly and/or indirectly. For example, smart infrastructure component 190B may be configured to communicate directly with mobile computing device 184B.2 via radio link 160B.8 and/or with mobile computing device 184B.1 via links 160B.2 and 160B.5 utilizing network 170B.

To provide some illustrative examples of the operation of the smart infrastructure component 190B, if smart infrastructure component 190B is implemented as a smart traffic light, smart infrastructure component 190B may change a traffic light from green to red (or vice-versa) or adjust a timing cycle to favor traffic in one direction over another based upon data received from the electric vehicle 108B and charging vehicle 140B. If smart infrastructure component 190B is implemented as a traffic sign display, smart infrastructure component 190B may display a warning message that an anomalous condition (e.g., an accident) has been detected ahead and/or on a specific road corresponding to the geographic location data.

Exemplary Mobile Device/on-Board Computer

Figure 2:
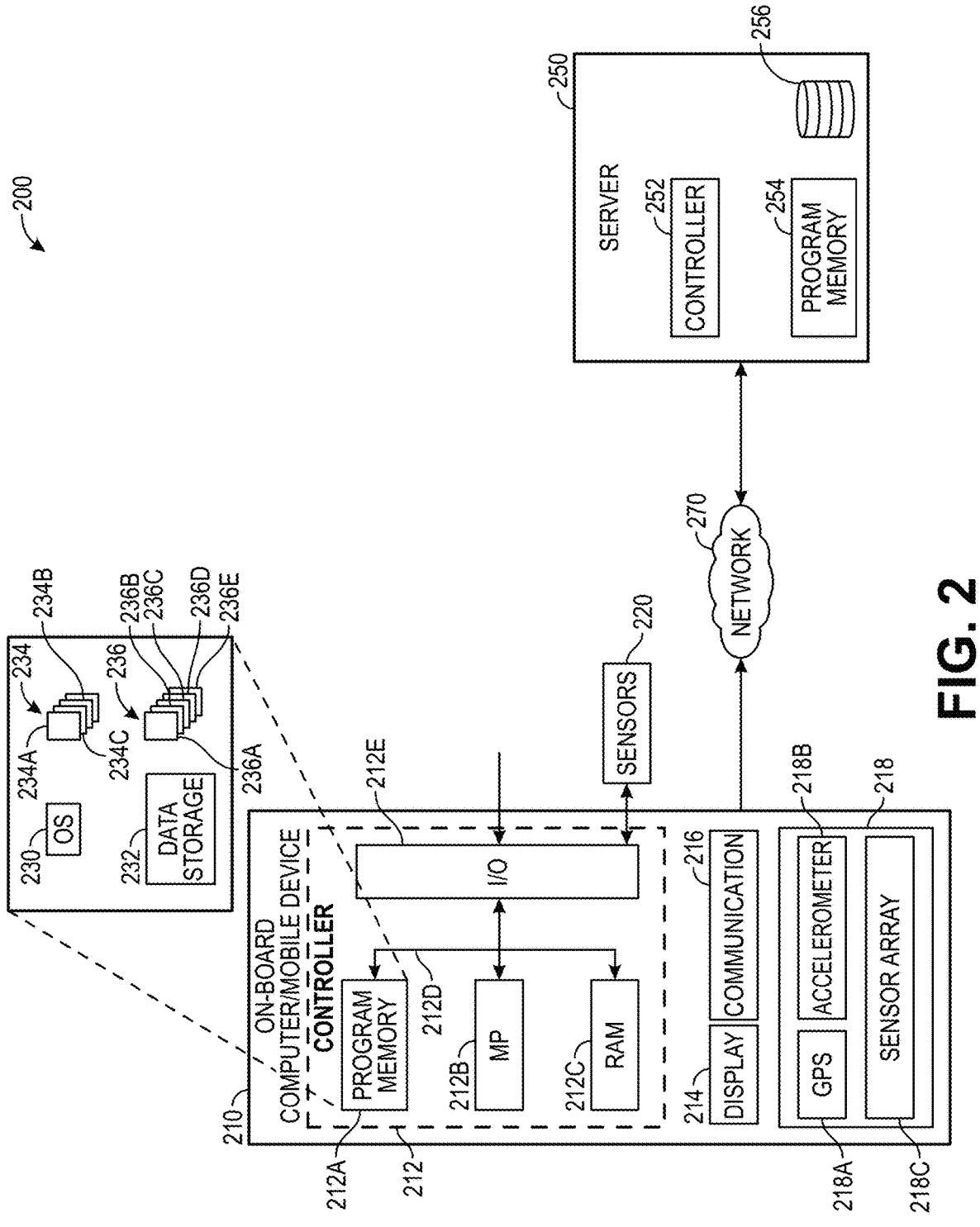
FIG. 2 illustrates a block diagram of an exemplary on-board computer or mobile device connected to a server via a network.

FIG. 2 illustrates a block diagram of an exemplary mobile device/on-board computer 210 consistent with the system 100A and the system 100B. The mobile device/on-board computer 210 may be the same as or similar to the mobile device 110A, the on-board computer 114A, the mobile computing device 184B.1, and/or the vehicle controller 134B. The mobile device/on-board computer may include a display 214, a GPS unit 218A, a communication unit 216, an accelerometer 218B, one or more additional sensors (not shown), a user-input device (not shown), and/or, a controller 212. In some embodiments, the mobile device 110A and on-board computer 114A may be integrated into a single device, or either may perform the functions of both. The mobile device/on-board computer 210 interfaces with the sensors 220 and/or personal electronic devices to receive information regarding a vehicle (e.g., the vehicle 108A and/or the vehicle 108B) and its environment, which information is used by the autonomous operation features to operate the vehicle.

The controller 212 may include a program memory 212A, one or more microcontrollers or microprocessors (MP) 212B, a RAM 212C, and an I/O circuit 212E, all of which are interconnected via an address/data bus 212D. The program memory 212A includes an operating system 230, a data storage 232, a plurality of software applications 234, and/or a plurality of software routines 236. The operating system 230, for example, may include one of a plurality of general purpose or mobile platforms, such as the Android™, iOS®, or Windows® systems, developed by Google Inc., Apple Inc., and Microsoft Corporation, respectively. Alternatively, the operating system 230 may be a custom operating system designed for autonomous vehicle operation using the on-board computer 210.

The data storage 232 may include data such as user profiles and preferences, application data for the plurality of applications 234, routine data for the plurality of routines 236, and other data related to the autonomous operation features. In some embodiments, the controller 212 may also include, or otherwise be communicatively connected to, other data storage mechanisms (e.g., one or more hard disk drives, optical storage drives, solid state storage devices, etc.) that reside within the vehicle.

It should be appreciated that although FIG. 2 depicts only one microprocessor 212B, the controller 212 may include multiple microprocessors 212B. Similarly, the memory of the controller 212 may include multiple RAMs 212C and multiple program memories 212A. Although FIG. 2 depicts the I/O circuit 212E as a single block, the I/O circuit 212E may include a number of different types of I/O circuits. The controller 212 may implement the RAMs 212C and the program memories 212A as semiconductor memories, magnetically readable memories, or optically readable memories, for example.

The one or more processors 212B may be adapted and configured to execute any of one or more of the plurality of software applications 234 or any one or more of the plurality of software routines 236 residing in the program memory 212, in addition to other software applications. One of the plurality of applications 234 may be an autonomous vehicle operation application 234A that may be implemented as a series of machine-readable instructions for performing the various tasks associated with implementing one or more of the autonomous operation features. Another of the plurality of applications 234 may be a battery charging application 234C that may be implemented as a series of machine-readable instructions for issuing a notification that the vehicle is charging. Still another application of the plurality of applications 234 may include a roadside services application 234B that may be implemented as a series of machine-readable instructions for communicating with the remote server 150B via a network 270, which may be the same as or similar to the network 170.

The plurality of software applications 234 may call various of the plurality of software routines 236 to perform functions relating to autonomous vehicle operation, monitoring, or communication. One of the plurality of software routines 236 may be a power control routine 236A to issue a notification that the vehicle is charging. Another of the plurality of software routines 236 may be a sensor control routine 236B to transmit instructions to a sensor 220 and receive data from the sensor 220. Still another of the plurality of software routines 236 may be an autonomous control routine 236C that performs a type of autonomous control, such as collision avoidance, lane centering, or speed control. In some embodiments, the autonomous vehicle operation application 234A may cause a plurality of autonomous control routines 236C to determine control actions required for autonomous vehicle operation.

Similarly, one of the plurality of software routines 236 may be a monitoring and reporting routine 236D that transmits information regarding autonomous vehicle operation to the remote server 250 via the network 270. Yet another of the plurality of software routines 236 may be a roadside services communication routine 236E for receiving and transmitting information between the vehicle and the remote server 150B. Any of the plurality of software applications 234 may be designed to operate independently of the software applications 234 or in conjunction with the software applications 234.

The controller 212 of the on-board computer 210 may implement the autonomous vehicle operation application 234A to communicate with the sensors 220 to receive information regarding the vehicle and its environment, and process that information for autonomous operation of the vehicle.

In addition to connections to the sensors 220 that are external to the mobile device/on-board computer 210, the mobile device/on-board computer 210 may include additional sensors 220, such as the GPS unit 218A or the accelerometer 218B, which may provide information regarding the vehicle for operation and other purposes. Such sensors 220 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the vehicle.

Furthermore, the communication unit 216 may communicate with other autonomous vehicles, infrastructure, or other external sources of information to transmit and receive information relating to vehicle operation. The communication unit 216 may communicate with the external sources via the network 170B or via any suitable wireless communication protocol network, such as wireless telephony (e.g., GSM, CDMA, LTE, etc.), Wi-Fi (802.11 standards), WiMAX, Bluetooth, infrared or radio frequency communication, etc. The communication unit 216 may provide input signals to the controller 212 via the I/O circuit 212E. The communication unit 216 may also transmit sensor data, device status information, control signals, or other output from the controller 212 to one or more external sensors within the vehicle, mobile device/on-board computers 210, or servers 140.

The mobile device/on-board computer 210 may include a user-input device (not shown) for receiving instructions or information from the vehicle operator, such as settings relating to an autonomous operation feature. The user-input device (not shown) may include a "soft" keyboard that is displayed on the display 214, an external hardware keyboard communicating via a wired or a wireless connection (e.g., a Bluetooth keyboard), an external mouse, a touch pad, a microphone, or any other suitable user-input device. The user-input device (not shown) may also include a microphone capable of receiving user voice input.

Exemplary Electric Vehicle Charging Scenario

Figure 3A:
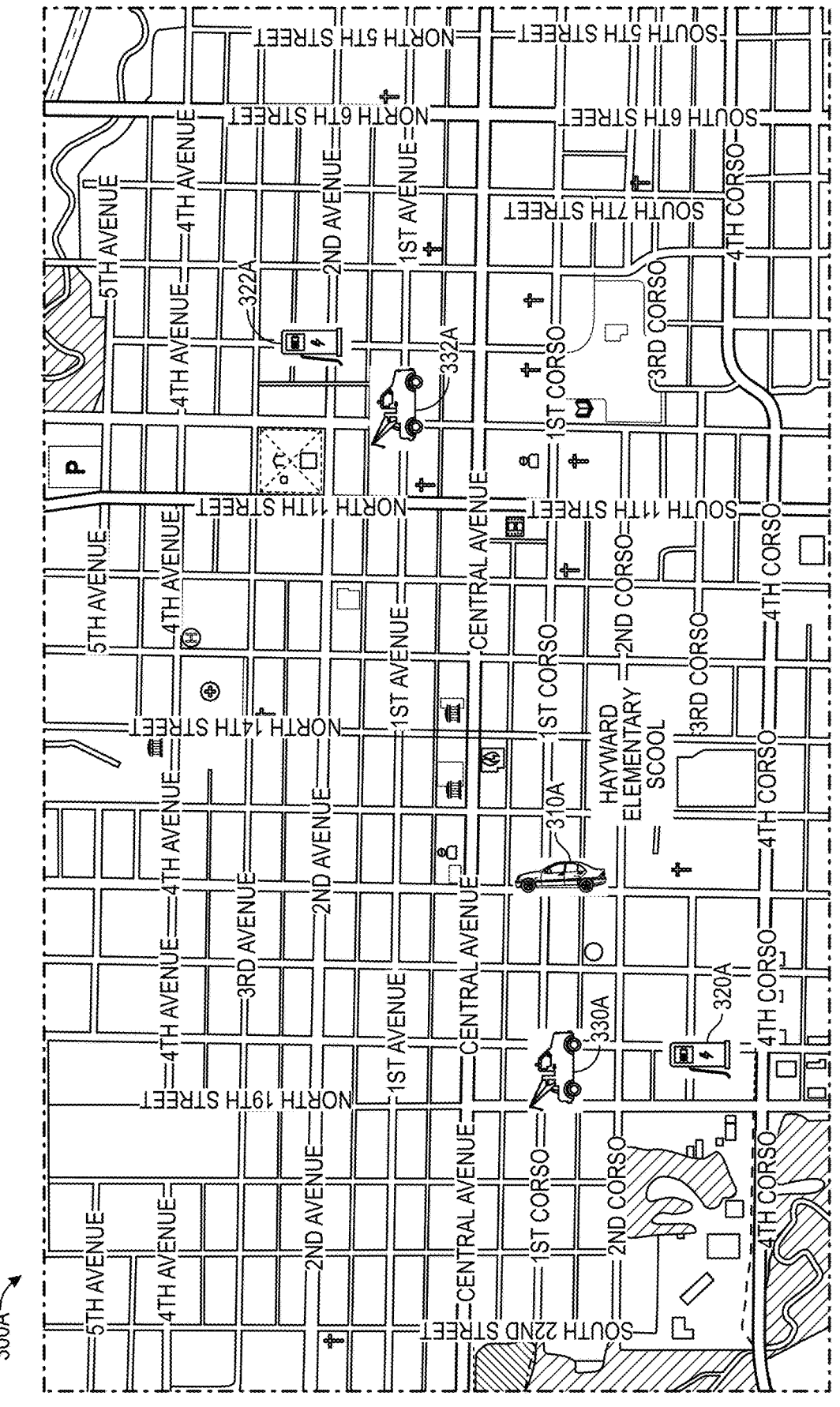
FIG. 3A illustrates an exemplary street map of a scenario preceding charging an EV.

FIG. 3A illustrates an exemplary street map of a scenario 300A preceding charging an EV 310A. The EV 310A may be the same as or similar to the EV 108A and/or the vehicle 108B. A closer charging vehicle 330A and/or a further charging vehicle 332A may be proximate enough to the EV 310A to provide sufficient battery power to the EV 310A to enable the EV 310A to reach a closer charging station 320A, a further charging station 322A, and/or another destination (not shown).

As illustrated, the EV 310A may require additional battery power to reach either a charging station (e.g., the charging stations 320A or 322A, or some other destination). In some aspects, when the battery of the EV 310A has a charge status (e.g., state of charge) that drops below a threshold amount of charge, the EV 310A may generate a low battery warning. In some aspects, the low battery warning may be displayed to the occupant of the EV 310A on a display, for example. In some aspects, the low battery warning may be transmitted external to the EV 310A, such as to one or more of the charging vehicles 330A and 332A (via V2V communications, for example), or to a server (e.g., the remote server 150B).

In some aspects, after (or before, or in addition to) displaying or transmitting the low battery warning, vehicle data for the EV 310A may be obtained by one or more of: the EV 310, one or more of the charging vehicles 330A and 332A, or the server. The vehicle data may include any information about the EV 310A, such as information that may be collected by sensors of the EV 310A. For example, the vehicle data may include a charge status of the EV 310A, location data of the EV 310A, battery performance data of the EV 310A, weight data of the EV 310A, driving behavior of the EV 310A, identifying features of the EV 310A, etc.

The charge status may include data such as a percentage of charge relative to the overall capacity of the battery of the EV 310 (e.g., 12% charge), a total amount of energy in the battery of the EV 310 (e.g., 2.2 kWh), an estimate of remaining range of the EV 310A (e.g., 7 miles), or some other suitable metric about how much charge the EV 310A has remaining.

The location data of the EV 310A may include information such as the current location of the EV 310A, a last known location of the EV 310A, a route of the EV 310A (entered at a navigation system, for example), a destination of the EV 310A (entered at a navigation system, for example), an origin of the EV 310A (e.g., home address), an estimated future location of the EV 310A (based on speed, trajectory, predicted/most probable route, etc.), a predicted out-of-charge location (i.e., if the EV 310A continues driving, where will it likely run out of charge), etc.

The battery performance data of the EV 310A may give information about how the battery of the EV 310A performs under average cases, best cases, or worst cases, for example. The battery performance data of the EV 310A may include metrics such as an energy unit per distance unit (e.g., kWh per mile), running time, etc. The battery performance data of the EV 310A may also include information about how the metrics are affected/vary based on other factors. For example, the battery performance data of the EV 310A may include information about how kWh per mile changes based on one or more of: the speed the EV 310A is traveling, the weather or temperature of the environment the EV 310A is driving through, the features being used in the EV 310 (e.g., the climate control or seat heather), the road surface on which the EV 310A is traveling, the age or usage (e.g., runtime or miles driven) of the battery in the EV 310A, weight of the EV 310A, or other factors which may affect the performance of the battery.

The weight data of the EV 310A may include information about the curb weight or the gross weight of the EV 310A. In aspects when the EV 310A is a cargo vehicle transporting heavy cargo the weight data of the EV 310A may be particularly important to consider as the curb weight may be very different than the gross weight. The weight data of the EV 310A may include current weight of the EV, previous weight of the EV 310A (such as during a previous leg of the journey, after which the EV 310A dropped off cargo), or future expected weight of the EV 310A (such as during a next leg of the journey in which the EV 310A is picking up cargo). As mentioned previously, the weight of the EV 310A may be an important factor to consider in the battery performance data.

The driving behavior of the EV 310A may include information about how the EV 310A is being driven by either an operator, or autonomously. For example, the driving behavior of the EV 310A may include information about speed behavior, acceleration behavior, braking behavior, turning behavior, or any other driving behavior which may affect the range of the EV 310A.

In some aspects, a minimum amount of charge required for the EV 310A to reach a destination or a charging station (e.g., the charging stations 320A and 322A) may be determined. Determining a minimum amount of charge required to reach either the destination of the charging station may be based on the vehicle data. In some aspects, the EV 310A itself may determine the minimum amount of charge required, in some aspects the determining may be done by one or more of the charging vehicles 320A or 322A, or the server. In some aspects, the minimum amount of charge required may not be specific to the EV 310A itself (i.e., not based on certain aspects of the vehicle data of the EV 310A such as battery performance data, weight data, or driving behavior) and may instead use things like industry standards, best practices, or averages.

If it is determined that the EV 310A does not have an amount of charge remaining that is at least the minimum amount of charge required to reach either the destination or a charging station (e.g., the charging stations 320A or 322A), then one or more of the charging vehicles 330A or 332A may be dispatched. The dispatch of the charging vehicle 330A or 332A may be by the server (e.g., the remote server 150B), by the charging vehicle 330A or 332A, or by the EV 310A itself.

The charging vehicles 330A and 332A may be a tow truck, an autonomous vehicle and/or an electric vehicle. One of the charging vehicles charging vehicle 330A and 332A may meet the EV 310A at a meeting point to charge the battery of the EV 310A. The charging vehicles 330A and 332A may charge the EV 310A either while stationary (i.e., roadside charging), or while both EV 310A and one of the charging vehicles 330A and 332A is moving (i.e., the two vehicles are electrically coupled while driving).

As illustrated in the scenario 300A of FIG. 3A, the route of the EV 310A may not be known or predefined. At least because the route of the EV 310A is not known or predefined in the scenario 300A, the nearest charging station 320A may be selected as a target charging station as opposed to the further charging station 322A. However, in the scenario 300A, the EV 310A may be unable to reach the nearest charging station 320A either because the EV 310A is completely out of battery power, or the EV 310A has some battery power, but not enough to reach the nearest charging station 320A. Also at least because the route of the EV 310A is not known or predefined in the scenario 300A, the nearest charging vehicle 330A may be dispatched as opposed to the further charging vehicle 332A.

If the EV 310A is completely out of battery power, the nearest charging vehicle 320A may be dispatched to the current location of the EV 310A as a meeting point. On the other hand, if the EV 310A has some battery power, the EV 310A may be instructed (automatically if the EV 310A is autonomous, or via instruction to the driver if not autonomous) to meet at a meeting point at which the nearest charging vehicle 330A may be dispatched to as well.

At the meeting point, the nearest charging vehicle 330A may deliver electrical power to the EV 310A until the EV 310A has at least a minimum amount of charge to reach the nearest charging station 320A. Determining the minimum amount of charge to reach the charging station may be based upon the location of the nearest charging station 320A and the vehicle data.

In some examples, however, the nearest charging vehicle 330A may be unable to deliver at least the minimum amount of charge to reach the nearest charging station 320A. This may be because the charging vehicle 330A does not have enough electrical power in its own battery, or because the nearest charging station 320A is so far away that even when the battery of the EV 310A is fully charged, the EV 310A still cannot reach the nearest charging station 320A.

In either case, in some aspects, the charging vehicle 330A may deliver as much electrical power to the EV 310A as possible and then the EV 310A may continue towards the nearest charging station 320A and, again at a later time, request dispatch of a second charging vehicle. In other aspects, if the nearest charging vehicle 330A may be unable to deliver at least the minimum amount of charge to reach the nearest charging station 320A, the charging vehicle 330A may be equipped to either tow the EV 310A or simply pick up the passengers or cargo of the EV 310A.

In some implementations, the EV 310A may provide payment to the charging vehicle 330A for receiving electrical power from the charging vehicle 330A. More specifically, the charging vehicle 330A and/or the mobile computing device 184B.2 may generate payment data for providing electrical power to the EV 310A, such as a total payment amount, a payment amount per unit of charge, the amount of charge provided to the EV 310A, etc. The charging vehicle 330A and/or the mobile computing device 184B.2 may transmit the payment data to the EV 310A and/or the mobile computing device 184B.1, for example via a V2V wireless communication. In response to receiving the payment data, the EV 310A and/or the mobile computing device 184B.1 may transmit payment to the charging vehicle 330A and/or the mobile computing device 184B.2, for example via a V2V wireless communication.

Also in some implementations, the vehicle data may be stored and/or used for additional purposes, such as providing insurance quotes, insurance discounts, vehicle loan information or quotes, auto insurance information, and/or EV and EV battery maintenance or care recommendations to the EV owner or prospective owner. The vehicle data may include data associated with the EV, such as battery performance data including battery health and usage information, an estimated life remaining in the battery, weight data for the EV, location data for the EV, driving behavior data for the EV, identifying features for the EV, etc. The payment data associated with paying for towing and/or charging services may also be stored and/or used for additional purposes.

In some implementations, the payment data, EV data, and/or battery data may be stored and/or accessed via one or more blockchains or distributed ledgers. Additionally or alternatively, in some scenarios, the EV 310A may provide payment to the charging vehicle 330A via a token having value that circulates on the blockchain or distributed ledger.

A "distributed ledger" may be a transactional record that is maintained at each node of a peer to peer network. Commonly, the distributed ledger is comprised of groupings of transactions bundled together or compiled into a "block." When a change to the distributed ledger is made (e.g., when a new transaction and/or block is created), each node must form a consensus as to how the change is integrated into the distributed ledger. Upon arriving at consensus, the agreed upon change may be pushed out or distributed to each node so that each node maintains an identical copy of the updated distributed ledger. Any change that does not achieve a consensus is ignored. Accordingly, unlike a traditional, centralized ledger, a single party cannot unilaterally alter the distributed ledger.

In an application of distributed ledgers, each new block may be cryptographically linked to the previous block in order to form a "blockchain." More particularly, to create a new block, each transaction within a block may be assigned a hash value (i.e., an output of a cryptographic hash function, such as SHA-2 or MD5). These hash values may then be combined together utilizing cryptographic techniques (e.g., a Merkle Tree) to generate a hash value representative of the entire new block. This hash value may then be combined with the hash value of the previous block to form a hash value included in the header of the new block, thereby cryptographically linking the new block to the blockchain. To this end, the precise value utilized in the header of the new block is dependent on the hash value for each transaction in the new block, as well as the hash value for each transaction in every prior block.

According to aspects, the hash value generated for the new block may be used as an input to a cryptographic puzzle that manipulates a nonce value. When a solution to the cryptographic puzzle is found, the solving node publishes the solution and the other nodes then verify that the solution is the correct solution. Because the solution also depends on the particular hash values for each transaction within the blockchain, if the solving node attempted to modify any transaction, the solution would not be verified by the other nodes.

More particularly, if a single node attempts to modify a prior transaction within the blockchain, a cascade of different hash values are generated for each tier of the cryptographic combination technique. This results in the header for one or more blocks being different than the corresponding header(s) in every other node that did not make the exact same modification. As a result, the solution generated by the modifying node would not solve the cryptographic puzzle presented to any node without the identical modification. Thus, the version of the new block generated by the modifying node is readily recognized as including an improper modification and is rejected by the consensus. This inability to modify past transactions lead to blockchains being generally described as trusted, secure, and/or immutable.

The EV 310A, the charging vehicle 330A, the remote server 150B, and/or the mobile computing devices 184B.1, 184B.2, may broadcast transactions to the distributed ledger or blockchain which include the payment data, EV data, and/or battery data. Accordingly, the payment data, EV data, and/or battery data may be stored in a trusted, secure, immutable, and/or tamper resistant manner. For example, if one of the parties (the EV 310A, the charging vehicle 330A, etc.) disputes the terms of the payment and/or whether the payment was made at a later date, the other party can use the immutable record in the distributed ledger to show the terms of the payment and/or whether the payment was made.

Exemplary Electric Vehicle Charging Scenario

Figure 3B:
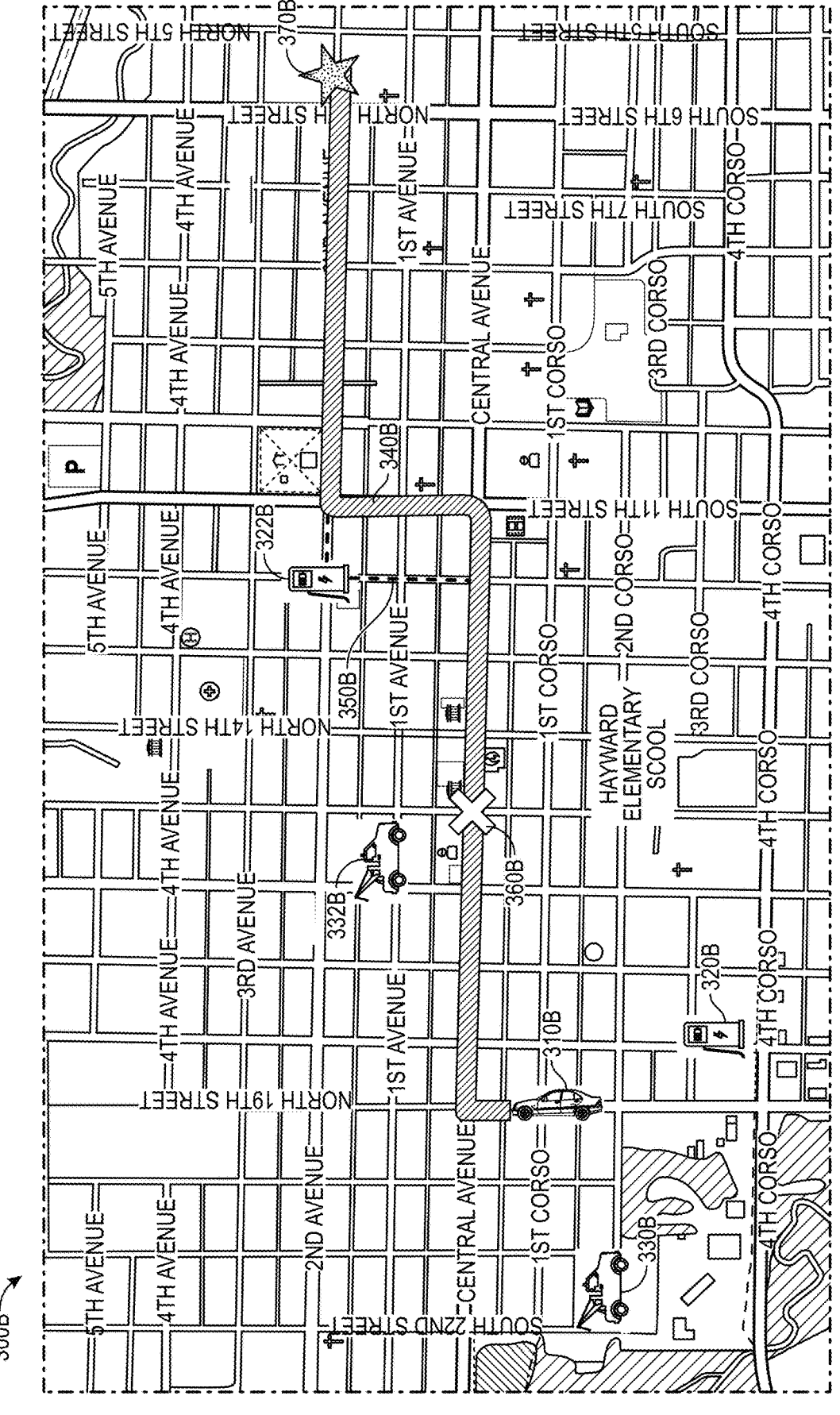
FIG. 3B illustrates an exemplary street map of a scenario preceding charging an EV overlaid with routes to a charging station and/or destination.

FIG. 3B illustrates an exemplary street map of a scenario 300B which is similar to the scenario 300A. An EV 310B, charging stations 320B and 322B, and charging vehicles 330B and 332B may be the same as or similar to the EV 310A, the charging stations 320A and 322A, and the charging vehicles 330A and 332A, respectively. The scenario 300B may represent a moment in time preceding charging the EV 310B overlaid with a planned route 340B and an alternate route 350B.

Unlike in the scenario 300A of FIG. 3A, the route of the EV 310B is known or predefined (i.e., the planned route 340B). To determine each of: (i) a meeting point 360B, (ii) which one of the charging vehicles 330B and 332B will be dispatched, and (iii) which one of the charging stations 320B and 322B will be selected, an optimization problem may need to be solved (e.g., by a server, the EV 310B, and/or the charging vehicles 330B and 332B). The optimization problem may seek to optimize for travel time (e.g., reducing how long the EV 310B and/or the dispatched charging vehicle travels), optimize for total time (e.g., select charging stations or charging vehicles that can provide electrical power at a faster rate), optimize for distance (e.g., reducing the distances traveled by the EV 310B and/or the dispatched charging vehicle travels), or optimize for cost (e.g., if each of the charging stations 320B and 322B and/or the charging vehicles 330B and 332B charge different amounts of money per kWh, reducing the total cost for the operator of the EV 310B).

During optimization, there may be certain constraints which must be respected. For example, remaining range of the EV 310B may be used as a constraint (e.g., the EV 310B must have enough battery power to reach the meeting point 360B). In another example, a station type of the charging stations may be a constraint (e.g., a Tesla standard charging station may not be compatible with the EV 310B if the EV 310B uses CSS charging standards).

As illustrated, at least because the planned route 340B is not in the direction of the nearest charging station 320B, the further charging station 322B may be selected and the further charging vehicle 332 may be dispatched to the determined meeting point of 360B (e.g., to optimize for travel time, travel distance, cost, etc.).

The meeting location 360B may correspond to a point along the planned route 340B of the EV 310B, which may result in greater efficiency and less delay, as the EV 310B may not have to spend time or deplete battery power traveling away from the planned route 340B of the EV 310B. In other implementations, the planned meeting location 360B may correspond to a point between the EV 310B and the closer charging vehicle 330B, which may result in the EV 310B traveling away from its planned route 340B.

As discussed with respect to scenario 300A, the EV 310B and/or the further charging vehicle 332 may travel to meeting point 360B either autonomously, or under manual control. And once at the meeting point 360B, the further charging vehicle 332B may deliver a minimum amount of charge required for the EV 310B to travel to the further charging station 322B based upon the location of the charging station 322B and vehicle data either while the two vehicles are stationary (e.g., roadside), or while the two vehicles are moving and are electrically coupled.

After the EV 310B has received the minimum amount of charge required to travel to the further charging station 322B, the planned route 340B of the EV 310B to a destination 370B, may be modified to the alternate route 350B that passes by the further charging station 322B. In some aspects, an estimated time of arrival (ETA) for the EV 310B at the destination 370B may be determined based upon an expected amount of time for (i) the further charging vehicle 332B to deliver, to the EV 310B, the electrical power until the EV 310B has at least the minimum amount of charge and (ii) the further charging station 322B to deliver, to the EV 310B, an additional amount of charge.

In other aspects, the charging vehicle 332B may provide sufficient battery power to the EV 310B to enable the EV 310B to reach its destination 370B directly (i.e., without needing to stop at the further charging station 332B).

As previously discussed, the charging vehicle 332B may be a tow truck, an autonomous vehicle and/or an electric vehicle. At meeting location 360B, in some implementations, charging vehicle 332B may tow the EV 310B along planned route 340B of the EV 310B while the charging vehicle 332B provides battery power to the EV 310B. Charging the EV 310B while the charging vehicle 332B tows the EV 310B may result in significantly reduced delay, as the EV 310B may continue to travel along its planned route 340B.

In some implementations, the EV 310B may provide payment to the charging vehicle 332B for receiving electrical power from the charging vehicle 332B. More specifically, the charging vehicle 332B and/or the mobile computing device 184B.2 may generate payment data for providing electrical power to the EV 310B, such as a total payment amount, a payment amount per unit of charge, the amount of charge provided to the EV 310B, etc. The charging vehicle 332B and/or the mobile computing device 184B.2 may transmit the payment data to the EV 310B and/or the mobile computing device 184B.1, for example via a V2V wireless communication. In response to receiving the payment data, the EV 310B and/or the mobile computing device 184B.1 may transmit payment to the charging vehicle 332B and/or the mobile computing device 184B.2, for example via a V2V wireless communication.

Exemplary Charging Vehicles and Charging Modes

Figure 4:
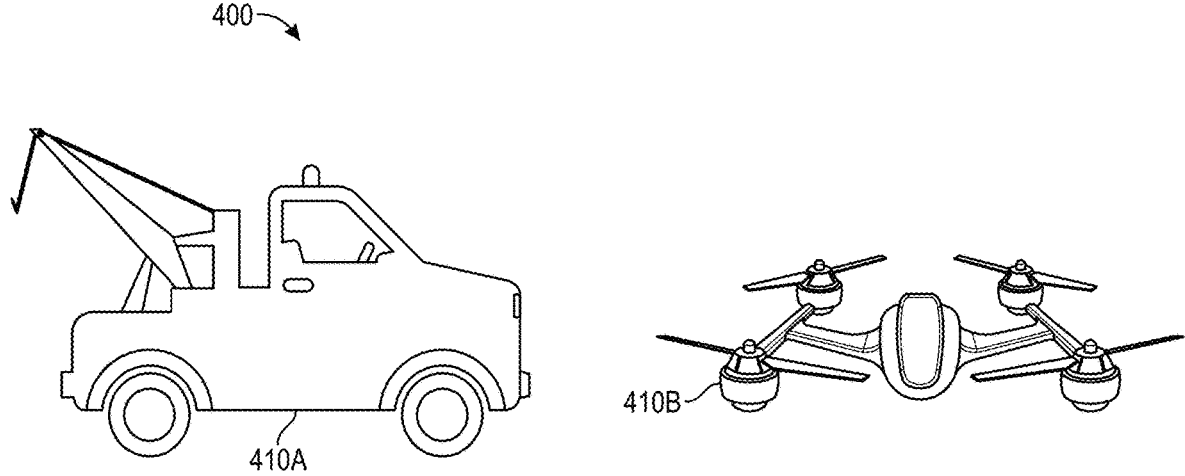
FIG. 4 illustrates exemplary vehicles involved in charging EVs.
Figure 4:
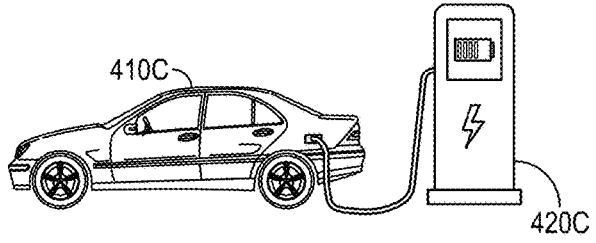

FIG. 4 illustrates exemplary vehicles including a tow truck charging vehicle 410A, a drone charging vehicle 410B, and an EV 410C charging at a stationary charging station 420C. In some implementations, the tow truck charging vehicle 410A may be configured to tow the EV 410C (which may be the same as or similar to any of the other EVs discussed with reference to any of the other figures) behind the tow truck charging vehicle 410A while charging the EV 410C. In other implementations, the tow truck charging vehicle 410A may include an attached flatbed or flatbed trailer which may carry the EV 410C while the tow truck charging vehicle 410A charges the EV 410C. Also in some implementations, the tow truck charging vehicle 410A may magnetically couple to the EV 410C.

In some implementations, the tow truck charging vehicle 410A may couple to the EV 410C with the EV 410C leading and the tow truck charging vehicle 410A following. Alternatively, the tow truck charging vehicle 410A may couple to the EV 410C with the tow truck vehicle 410A leading and the EV 410C following.

In some implementations, coupling may occur while the tow truck charging vehicle 410A and the EV 410C are moving. In other implementations, coupling may occur while at least one of the tow truck charging vehicle 410A and the EV 410C are not moving. The tow truck charging vehicle 410A may tow and/or charge one or any number of additional EVs 410C. In some implementations, more than one tow truck charging vehicle 410A may couple with each other and/or one or more EVs 410C to simultaneously tow and/or charge the EVs 410C.

In some implementations, a drone charging vehicle 410B may fly to a meeting point 360B and/or may couple with an EV 410C to charge the EV 410C. In further implementations, more than one drone charging vehicle 410B may meet the EV 410C and charge the EV 410C. In implementations including more than one charging vehicle, charging vehicles may be of the same type (i.e., all drone charging vehicles 410B or all tow truck charging vehicles 410A) or the charging vehicles may be a variety of types (i.e., one or more drone charging vehicles 410B, one or more tow truck charging vehicles 410A, one or more SUV charging vehicles (not shown), etc.). In some implementations, a drone charging vehicle 410B may land atop the EV 410C to charge the EV 410C. Also in some implementations, the drone charging vehicle 410B may land atop and/or couple to the EV 410C to charge the EV 410C while the EV 410C is moving. Alternatively, the drone charging vehicle 410B may land atop and/or couple to the EV 410C while the EV 108A is stopped.

In some implementations, the drone charging vehicle 410B may use rotating blades to fly. Alternatively, or in combination, the drone charging vehicle 410B may fly, for example, using fixed wings, rocket propulsion, gliding, etc. In further implementations, the drone charging vehicle 410B may be configured to both fly and travel on the ground, for example, using wheels and/or a motor.

In some implementations, the EV 410C may charge at a stationary charging station 420C. The EV 410C may be a personal or commercial vehicle (e.g., used for hauling cargo, rideshare, etc.). In some implementations the EV 410C may meet another EV and charge the other EV such as by coupling with the other EV. In some implementation, the EV 410C may be occupied by employees of a charging service company, which may coordinate the efforts of a fleet of charging vehicles. In other implementations, the EV 410C may be a personal vehicle occupied by individuals providing charging services, for example, via a mobile application (e.g., installed on a mobile device 184B.2). In still other implementations, the EV 410C may be an autonomous vehicle with no human occupant.

The charging station 420C may be the same as or similar to the charging stations 320A/B or 322A/B. The charging station 420C could be a private or public charging station. For example, the charging station 420C may be a public charging station which may be paid or free. In another example, the charging station 420C may be a private charging station such as the home or work of the occupant of the EV 410C.

Exemplary Coupling and Charging Process

Figure 5A:
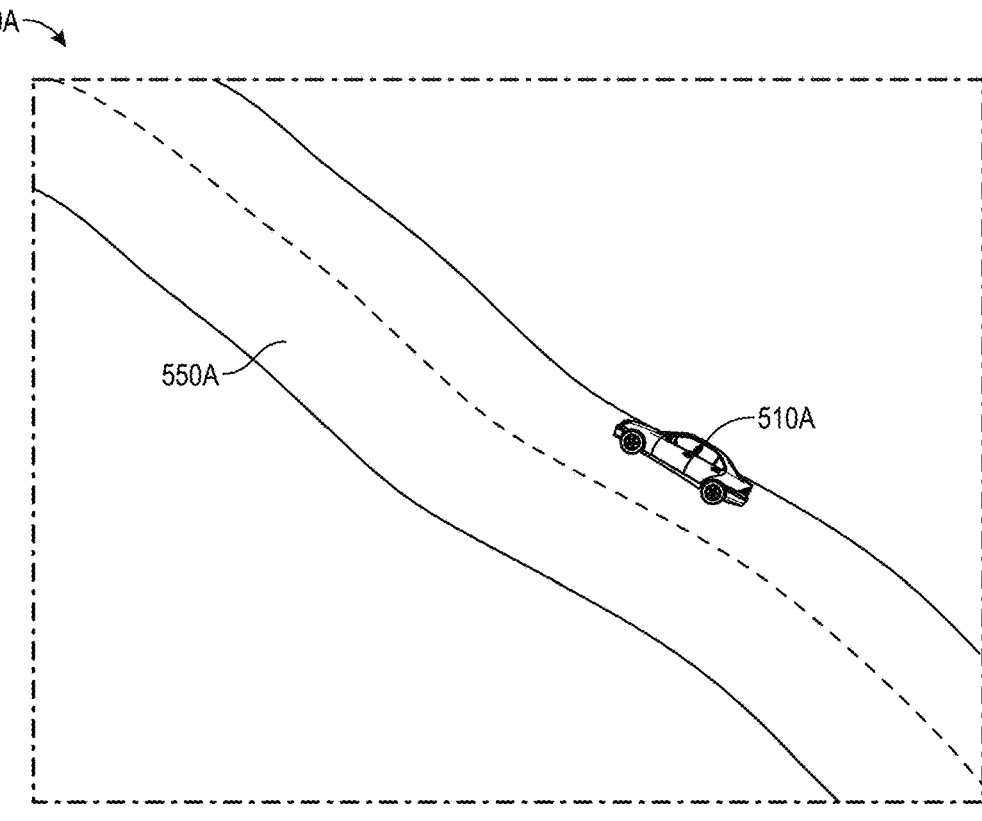
FIGS. 5A-C illustrate an exemplary charging process in which a charging vehicle couples to an EV and charges the EV as the EV is moving.
Figure 5B:
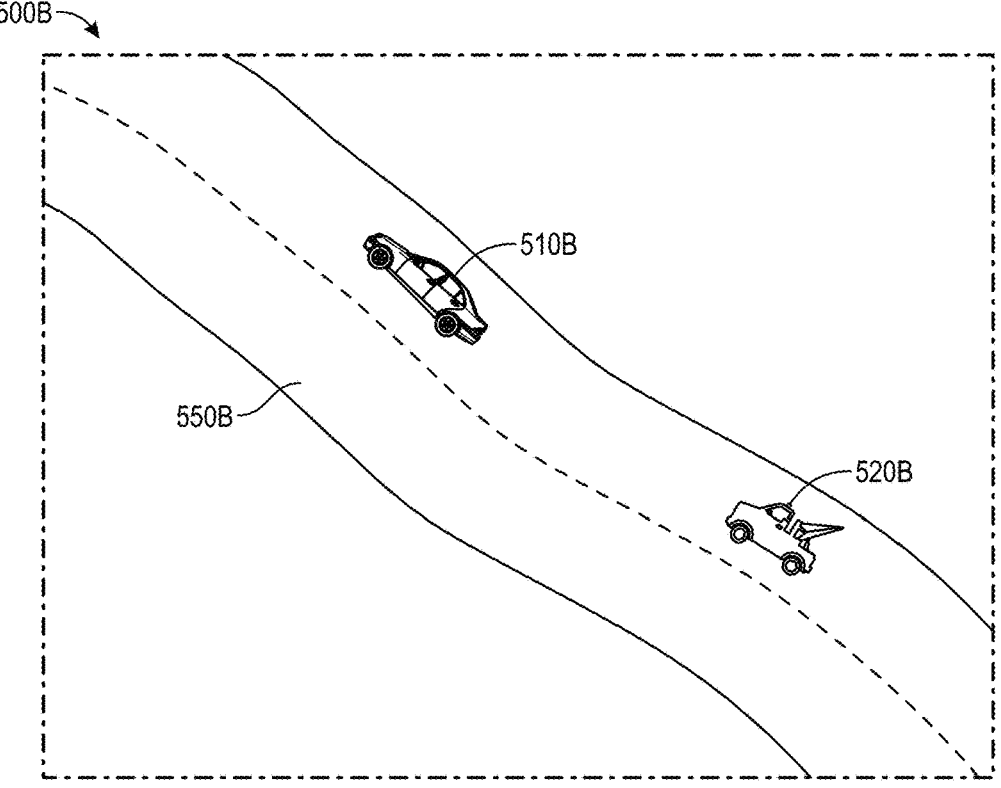
Figure 5C:
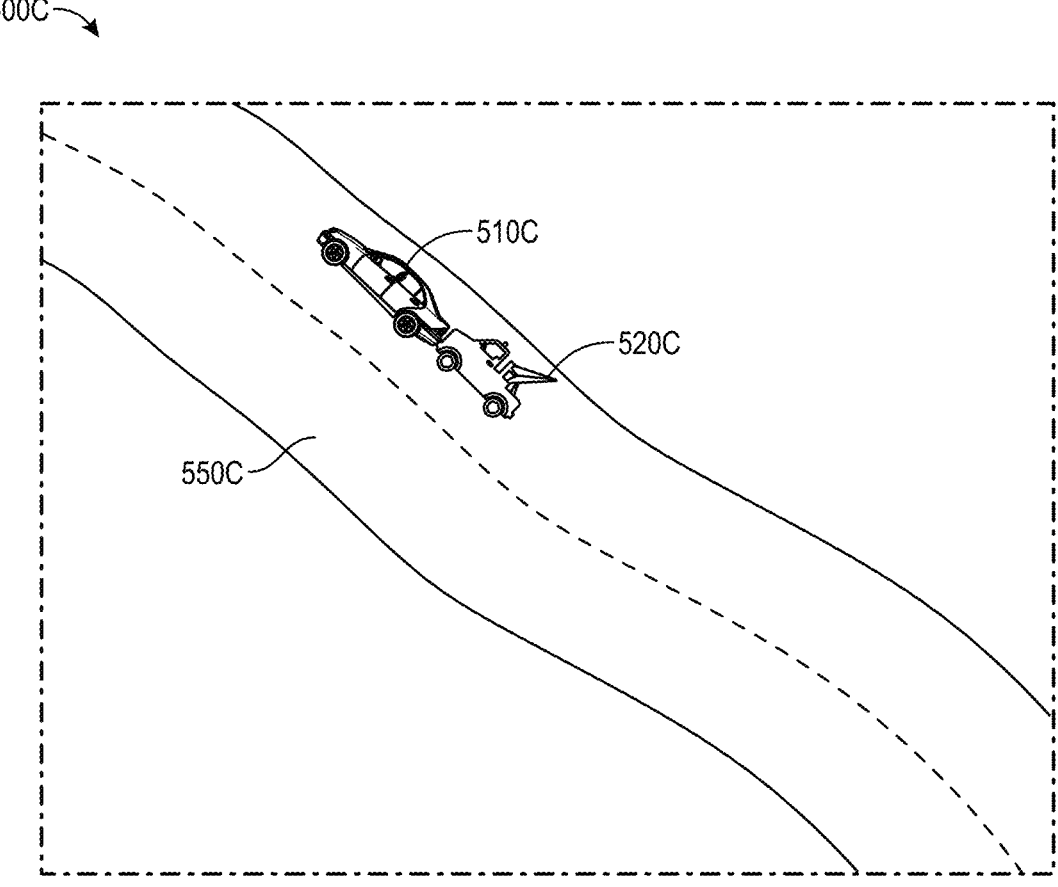

FIGS. 5A-C illustrate an exemplary coupling and charging process which may include an EV 510C and/or a charging vehicle 520C. The EV 510C may correspond to EV 510B and/or EV 510A. Charging vehicle 520C may correspond to charging vehicle 520B and/or 520A. Road 550C may correspond to road 550B and/or 550A. In some implementations, the EV 510A may travel along the road 550A and may require additional battery power. Also in some implementations, the EV 510A may send a notification such as via an on-board computer 114A and/or a mobile device 110A that charging is required. In some implementations, the EV 510A in need of charging may travel to a meeting location (e.g., the meeting location 360B of FIG. 3B).

FIG. 5A depicts the EV 510A traveling on the road 550A by itself. In some implementations, the EV 510A may transmit a signal indicating it is low on battery and needs recharging. The EV 510A may transmit the signal manually (e.g., in response to the operator of the EV 510A making a request) or automatically (e.g., by the EV 510A detecting it needs recharging) in accordance with techniques discussed elsewhere herein. For example, in some aspects, when the battery of the EV 510A has a charge status (e.g., state of charge) that drops below a threshold amount of charge, the EV 510A may generate a low battery warning.

In some aspects, the low battery warning may be displayed to the occupant of the EV 510A on a display, for example. In certain aspects, the low battery warning may be transmitted external to the EV 510A, such as to the charging vehicle 520A (via V2V communications, for example), or to a server (e.g., the remote server 150B).

FIG. 5B depicts the charging vehicle 520B and/or the EV 510B in close proximity with each other. In some implementations, the charging vehicle 520B and/or the EV 510B may communicate with each other via a network 170B and/or the direct communication link 160B.7 (i.e., V2V). The charging vehicle 520B and/or the EV 510B may exchange data such as EV 510B battery level, coupling capabilities/preferences, vehicle data (e.g., battery performance data, weight data, etc.), or motion data (e.g., current/future speed, current/future acceleration, current/future direction, etc.), etc.

Exchanging of the motion data may allow for the charging vehicle 520B and the EV 510B to couple so that the charging vehicle 520B and/or the EV 510B changes their speed such that the charging vehicle 520B and the EV 510B are traveling at the same or similar (e.g., within a threshold) speed upon coupling. For example, if the charging vehicle is traveling at 53 mph and the EV 510B is traveling at 45 mph, the charging vehicle may begin reducing its speeds in response to receiving an indication of the speed of the EV 510B such that the charging vehicle is traveling with 0.5 mph of 45 mph when coupling with the EV 510B.

In some aspects, the charging vehicle 520B may be outfitted with sensors (e.g., a digital camera, a LIDAR sensor, an ultrasonic sensor, an infrared sensor, etc.) that allow the charging vehicle 520B to determine its distance from the EV 510B and/or a speed difference between the charging vehicle 520B and the EV 510B. With the use of these sensors, there may not be a need for the motion data of one or more of the charging vehicle 520B or the EV 510B to be exchanged.

In certain aspects, there may be restrictions (e.g., for safety reasons) on when in which the charging vehicle 520B and the EV 510B may couple, such as restrictions on turning, speed, location, etc. For example, coupling may not be permitted above certain speeds, if charging vehicle 520B and/or the EV 510B are not both traveling in a straight line path, or if in certain densely populated areas. If a restriction is activated, the charging vehicle 520B and/or the EV 510B may need to change driving behavior (such as both slowing down) before coupling may commence.

In some aspects, the charging vehicle 520B and/or the EV 510B may prepare coupling mechanisms once within a certain range of each other. As will be discussed in more detail with respect to FIG. 5C, the charging vehicle 520B and the EV 510B may couple via an electromagnet, for example. In this example, once the charging vehicle 520B and the EV 510B are within a certain range of each other, the respective electromagnets may be energized in preparation for coupling.

FIG. 5C depicts the charging vehicle 520B and the EV 510B coupled to each other. Coupling may take place while the charging vehicle 520C and/or the EV 510C are moving. Alternatively, coupling may occur while the charging vehicle 520C and/or the EV 510C are stopped. In addition to, or instead of, charging the EV 510C, the charging vehicle 520C may push or tow the EV 510C after the charging vehicle 520C has coupled with the EV 510C.

The charging vehicle 520C and the EV 510C may couple together via one or more attachment mechanisms, such as two sets of magnets attached to each of the charging vehicle 520C and the EV 510C. Each of the sets of magnets may have the opposite polarity so that a magnet attached to the charging vehicle 520C (e.g., at the front of the charging vehicle 520C) is attracted to a magnet attached to the EV 510C (e.g., at the back of the EV 510C), thereby causing the two magnets to attach via magnetic attraction. In some aspects, each of the charging vehicle 520C and the EV 510C may be layered with a magnetic coating or may include magnetic materials to attach to each other. One or more of the sets of magnets may be permanent magnets or electromagnets that may be energized and/or de-energized.

In aspects where the one or more of the sets of magnets are electromagnets, an on-board computer, such as the on-board computer 114A, within the charging vehicle 520C and/or the EV 510C may send a control signal to energize the electromagnet(s) to attach the charging vehicle 520C and the EV 510C and/or a signal to de-energize the electromagnet(s) to detach the charging vehicle 520C and the EV 510C.

In aspects where the one or more of the sets of magnets permanent magnets, one or more of the charging vehicle 520C or the EV 510C may accelerate by more than a threshold acceleration in a direction opposite the direction of attachment in order to cause the charging vehicle 520C and the EV 510C to detach. The threshold acceleration may correspond to a force which is greater than the force of magnetic attraction of the magnets. For example, the EV 510C may be attached behind the charging vehicle 520C and, to detach, the EV 510C may accelerate backwards away (e.g., via reducing throttle and/or or applying breaks) from the front-facing attachment with the charging vehicle 520C by more than the threshold acceleration.

In some aspects, once the charging vehicle 520C and the EV 510C are coupled together, the charging vehicle 520C may tow (e.g., pull or push) the EV 510C such that the EV 510C is not moving under its own power and/or steering. In other aspects, once the charging vehicle 520C and the EV 510C are coupled, both the vehicles may continue to move under their own power and/or steering, but their power and/or steering controls may be synchronized (i.e., the same between the two vehicles) or coordinated (i.e., not necessarily the same between the two vehicles), such as via autonomous driving technology. For example, once the charging vehicle 520C and the EV 510C are coupled, using e.g., V2V transmissions, the charging vehicle 520C may transmit power and/or steering instructions to the EV 510C for autonomous functionality of the EV 510C to implement.

In some implementations, the EV 510C may provide payment to the charging vehicle 520C for receiving electrical power from the charging vehicle 520C. More specifically, the charging vehicle 520C and/or the mobile computing device 184B.2 may generate payment data for providing electrical power to the EV 510C, such as a total payment amount, a payment amount per unit of charge, the amount of charge provided to the EV 510C, etc. The charging vehicle 520C and/or the mobile computing device 184B.2 may transmit the payment data to the EV 510C and/or the mobile computing device 184B.1, for example via a V2V wireless communication. In response to receiving the payment data, the EV 510C and/or the mobile computing device 184B.1 may transmit payment to the charging vehicle 520C and/or the mobile computing device 184B.2, for example via a V2V wireless communication.

Exemplary Messaging Diagram

Figure 6:
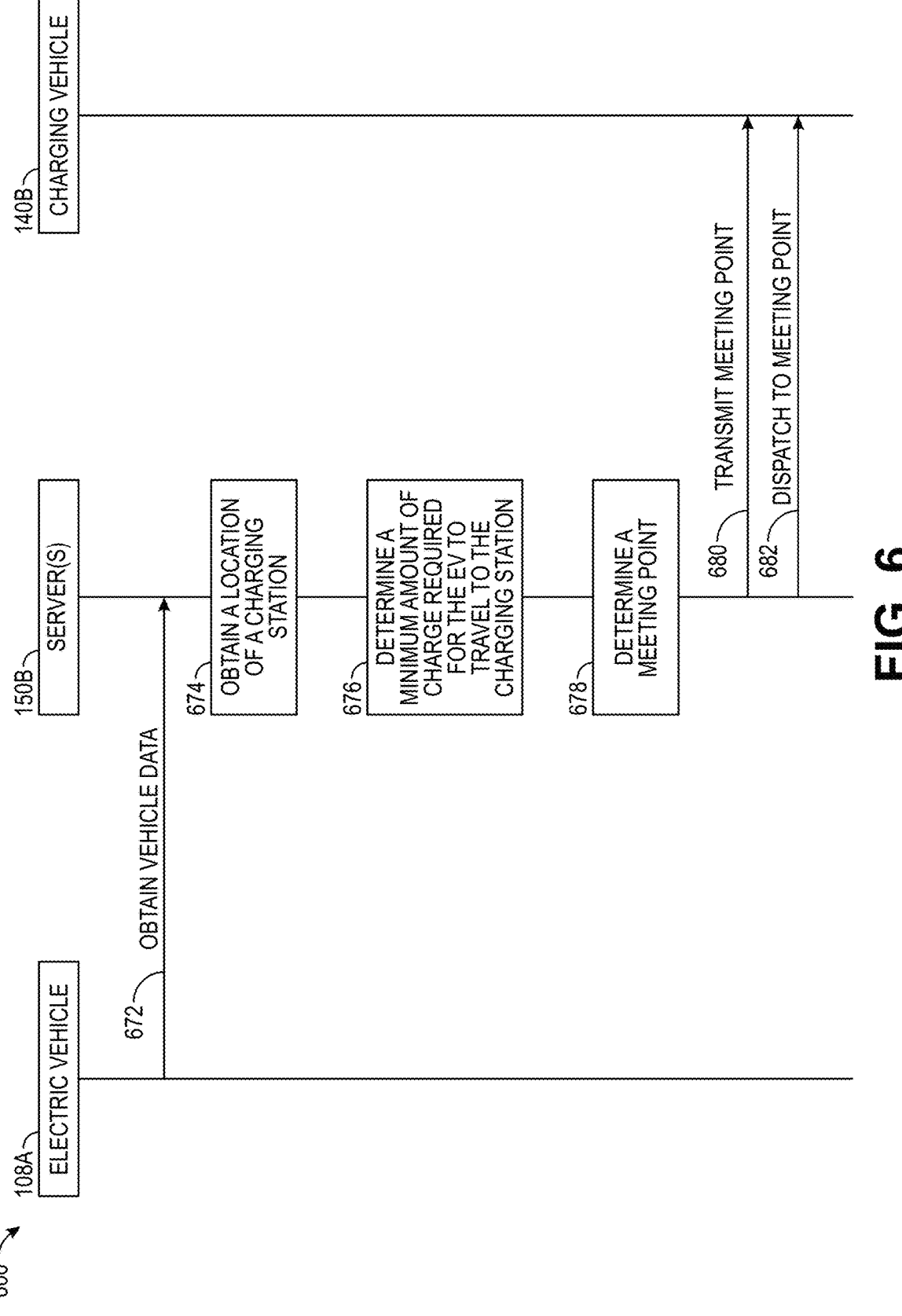
FIG. 6 illustrates an exemplary messaging diagram of dispatching a charging vehicle to charge an EV.

FIG. 6 illustrates an exemplary messaging diagram 600 indicating an exemplary interaction between the EV 108A, the remote server 150B, and the charging vehicle 140B when dispatching the charging vehicle 140B to charge the EV 108A.

When the amount of charge remaining in the EV 108A is less than a threshold amount of charge, the distance to the nearest charging and/or fueling station is greater than a threshold distance, or any suitable combination of these, the EV 108A may automatically transmit 672 a notification to the remote server 150B including vehicle data and requesting charging services. The vehicle data may include a charge status of the EV 108A, location data of the EV 108A, battery performance data of the EV 108A, weight data of the EV 108A, driving behavior of the EV 108A, identifying features of the EV 108A, etc.

The remote server 150B may obtain 674 a location of a charging station for charging the EV 108A. For example, the remote server 150B may obtain locations of charging stations within a threshold distance of the EV 108A from a map server.

The remote server 150B may then select one of the charging stations to charge the EV 108A. For example, the remote server 150B may select the charging station based on the distance from the charging station to the EV 108A, the distance from the EV's 108A route to the charging station, the speed in which the charging station may charge the EV 108A, the cost of charging the EV 108A, the type of charging station, and/or any combination of these.

In some implementations, the remote server 150B may assign a score to each of these factors and combine the scores in any suitable manner to identify the charging station having the highest score. Then the remote server 150B may select the highest scoring charging station as the charging station to charge the EV 108A.

Also in some implementations, the remote server 150B may assign weights to the scores so that some factors weigh more heavily than others. For example, the remote server 150B may assign the largest weight to the distance to the charging station to the EV 108A to minimize distance even if the cost or speed of the nearest charging station is not the minimum cost and/or fastest speed. In other implementations, the EV 108A and/or the charging vehicle 140B may select the charging station to charge the EV 108A. Then the EV 108A and/or the charging vehicle 140B may transmit an indication of the location of the charging station to the remote server 150B.

In response to obtaining the location of the charging station, the remote server 150B may determine 676 a minimum amount of charge required for the EV 108A to travel to the charging station. The remote server 150B may determine 676 the minimum amount of charge required based upon the location of the charging station and/or the vehicle data, such as the charge status of the EV 108A, the location of the EV 108A, battery performance metrics for the EV 108A (e.g., the energy unit per distance unit in various weather conditions, for various road surfaces, for various weights, for various speeds, for various driving behaviors, etc.), the weight of the EV 108A, and/or the driving behavior of the EV 108A, such as autonomous or manual.

For example, the remote server 150B may determine the distance from the EV 108A to the charging station. The remote server 150B may then determine the minimum amount of charge required for the EV 108A to travel to the charging station by applying the distance, other vehicle data (e.g., the weight of the EV 108A, the driving behavior of the EV 108A, the average speed of the EV 108A, etc.), and/or weather or road conditions to the battery performance metrics. More specifically, the remote server 150B may obtain a battery performance metric indicating that the battery may discharge one kWh per mile in hot weather conditions traveling between 50-60 mph, where one kWh may be equivalent to one percent of the battery power. The remote server 150B may also determine that the EV 108A is 7 miles from the charging station. Therefore, the minimum amount of charge required for the EV 108A to travel to the charging station may be 7 kWh or 7 percent battery power.

In any event, the remote server 150B may also determine 678 a meeting point for the charging vehicle 140B to meet and/or charge the EV 108A. The meeting point may be the location of the EV 108A. In other implementations, the remote server 150B may determine the meeting point as a location on the EV's 108A route. In yet other implementations, the remote server 150B may determine a meeting point that minimizes the total distance the EV 108A and the charging vehicle 140B have to travel to reach the meeting point. The remote server 150B may determine the meeting point based upon any suitable combination of the location of the EV 108A, waypoints on the EV's 108A route, waypoints on a route from the EV's current location to the charging station, the location of the charging vehicle 140B, the location of the charging station, the midpoint between the location of the EV 108A and the location of the charging vehicle 140B, and/or the maximum distance that the EV 108A can travel before running out of power.

In other implementations, the EV 108A and/or the charging vehicle 140B may determine the meeting point and may transmit an indication of the meeting point to the remote server 150B.

The remote server 150B may then transmit 680 an indication of the meeting point to the charging vehicle 140B and/or to the EV 108A. Then the remote server 150B may dispatch 682 the charging vehicle 140B to the meeting point. In other implementations, the charging vehicle 140B may dispatch itself to the meeting point. The EV 108A may also travel to the meeting point.

Exemplary Electric Vehicle Charging Method

FIG. 7 illustrates a flow diagram of an exemplary charging method 700 for charging an EV 108A until the EV 108A has enough power to reach a charging station 320A. In some embodiments, the charging method 700 may be implemented by the remote server 150B. In other implementations, the charging method 700 may be implemented by a charging vehicle 140B, an EV 108A, and/or any suitable combination of the remote server 150B, the EV 108A, and the charging vehicle 140B.

In some implementations, the EV 108A and/or the charging vehicle 140B may be operating in a fully autonomous mode of operation without any control decisions being made by a vehicle operator, excluding navigation decisions such as selection of a destination or route.

The charging method 700 may include obtaining vehicle data for an EV 108A requiring additional battery power to reach a charging station 320A (block 702), and obtaining a location of the charging station 320A (block 704). The charging method 700 may also include determining a minimum amount of charge required for the EV 108A to travel to the charging station 320A (block 706), and causing a charging vehicle 140B to be dispatched to a meeting point to deliver electrical power to the EV 108A (block 708). Although the method 700 is described with reference to the remote server 150B for simplicity, the described method may be easily modified for implementation by other systems or devices, including the charging vehicle 140B.

In some implementations, when the EV 108A has a charge status that drops below a threshold amount, the EV 108A may transmit an indication to the remote server 150B requesting charging services. The request may include vehicle data (block 702), such as the charge status of the EV 108A, location data of the EV 108A, battery performance data of the EV 108A, weight data of the EV 108A, driving behavior of the EV 108A, identifying features of the of the EV 108A, etc.

At block 704, the remote server 150B may obtain a location of a charging station 320A for charging the EV 108A after the EV 108A is provided with enough power to travel to the charging station 320A. For example, the remote server 150B may obtain locations of charging stations within a threshold distance of the EV 108A from a map server.

The remote server 150B may then select one of the charging stations to charge the EV 108A. For example, the remote server 150B may select the charging station based on the distance from the charging station to the EV 108A, the distance from the EV's 108A route to the charging station, the speed in which the charging station may charge the EV 108A, the cost of charging the EV 108A, the type of charging station, and/or any combination of these. In other implementations, the EV 108A and/or the charging vehicle 140B may select the charging station to charge the EV 108A. Then the EV 108A and/or the charging vehicle 140B may transmit an indication of the location of the charging station to the remote server 150B.

At block 706, the remote server 150B may determine a minimum amount of charge required for the EV 108A to travel to the charging station 320A. The remote server 150B may determine the minimum amount of charge required based upon the location of the charging station and/or the vehicle data, such as the charge status of the EV 108A, the location of the EV 108A, battery performance metrics for the EV 108A (e.g., the energy unit per distance unit in various weather conditions, for various road surfaces, for various weights, for various speeds, for various driving behaviors, etc.), the weight of the EV 108A, and/or the driving behavior of the EV 108A, such as autonomous or manual.

For example, the remote server 150B may determine the distance from the EV 108A to the charging station. The remote server 150B may then determine the minimum amount of charge required for the EV 108A to travel to the charging station by applying the distance, other vehicle data (e.g., the weight of the EV 108A, the driving behavior of the EV 108A, the average speed of the EV 108A, etc.), and/or weather or road conditions to the battery performance metrics.

Then at block 708, the remote server 150B may cause a charging vehicle 140B to be dispatched to a meeting point to deliver electrical power to the EV 108A. In some implementations, the meeting point may be the current location of the EV 108A. In other implementations, the remote server 150B may determine the meeting point as a location on the EV's 108A route. In yet other implementations, the remote server 150B may determine a meeting point that minimizes the total distance the EV 108A and the charging vehicle 140B have to travel to reach the meeting point.

The remote server 150B may also transmit an instruction to the charging vehicle 140B to charge the EV 108A until the battery power in the EV 108A reaches the minimum amount of charge required to travel to the charging station 320A. Once the amount of charge remaining in the battery of the EV 108A reaches the minimum amount of charge, the EV 108A may travel to the charging station 320A for example, to fully charge. In other implementations, the charging vehicle 140B may provide sufficient battery power to the EV 108A to enable the EV 108A to reach its destination 370B directly (i.e., without needing to stop at the charging station 320A). Then the EV 108A may travel to the destination 370B without stopping at the charging station 320A.

Exemplary Mobile Electric Vehicle Charging Method

FIG. 8 illustrates a flow diagram of an exemplary computer-implemented method 800 for charging an EV 108A as the EV 108A is moving. In some embodiments, the method 800 may be implemented by the remote server 150B. In other implementations, the method 800 may be implemented by a charging vehicle 140B, an EV 108A, and/or any suitable combination of the remote server 150B, the EV 108A, and the charging vehicle 140B.

In some implementations, the EV 108A and/or the charging vehicle 140B may be operating in a fully autonomous mode of operation without any control decisions being made by a vehicle operator, excluding navigation decisions such as selection of a destination or route. The charging vehicle 140B, when operating in the fully autonomous mode, may be referred to herein as an autonomous charging vehicle (ACV). The ACV may be a drone, a car, a tow truck, or any other suitable vehicle.

The method 800 may include obtaining a request to deliver electrical power to an EV 108A (block 802), and identifying at least one ACV 140B to charge the EV 108A (block 804). The ACV may be configured to charge the EV 108A while the ACV 140B and the EV 108A are each moving. The method 800 may also include obtaining EV 108A location data and ACV 140B location data (block 806), and determining a coupling location based upon the EV 108A location data and ACV 140B location data (block 808). Furthermore, the method may include dispatching the ACV 140B to the coupling location (block 810), and delivering electrical power to the EV 108A (block 812). The ACV 140B and the EV 108A may be moving for at least a portion of the time in which power is delivered to the EV 108A. Although the method 800 is described with reference to the remote server 150B for simplicity, the described method may be easily modified for implementation by other systems or devices, including the ACV 140B.

At block 802, the remote server 150B may obtain a request to deliver electrical power to an EV 108A. In some implementations, when the EV 108A has a charge status that drops below a threshold amount, the EV 108A may transmit an indication to the remote server 150B requesting charging services. The request may include vehicle data, such as the charge status of the EV 108A, location data of the EV 108A, battery performance data of the EV 108A, weight data of the EV 108A, driving behavior of the EV 108A, identifying features of the of the EV 108A, etc.

In other implementations, the EV 108A may present a prompt to be displayed to a vehicle occupant requesting input from the vehicle occupant regarding whether to dispatch an ACV 140B. In response to receiving input from the vehicle occupant requesting an ACV 140B, the EV 108A may transmit a request to the remote server 150B for electrical power.

In yet other implementations, the remote server 150B may determine a minimum amount of charge required for the EV 108A to travel to the destination or a charging station. The remote server 150B may determine the minimum amount of charge required based upon the location of the charging station and/or vehicle data for the EV 108A, such as the charge status of the EV 108A, the location of the EV 108A, battery performance metrics for the EV 108A (e.g., the energy unit per distance unit in various weather conditions, for various road surfaces, for various weights, for various speeds, for various driving behaviors, etc.), the weight of the EV 108A, and/or the driving behavior of the EV 108A, such as autonomous or manual.

For example, the remote server 150B may determine the distance from the EV 108A to the charging station. The remote server 150B may then determine the minimum amount of charge required for the EV 108A to travel to the charging station by applying the distance, other vehicle data (e.g., the weight of the EV 108A, the driving behavior of the EV 108A, the average speed of the EV 108A, etc.), and/or weather or road conditions to the battery performance metrics.

Then the remote server 150B may determine whether to dispatch an ACV 140B to the EV 108A based upon the minimum amount of charge required for the EV 108A to travel to the destination or a charging station. For example, if the minimum amount of charge required is greater than the amount of charge remaining in the battery of the EV 108A, the remote server 150B may determine to dispatch an ACV 140B to the EV 108A. Otherwise, the remote server 150B may not dispatch an ACV 140B to the EV 108A.

At block 804, the remote server 150B may identify at least one ACV 140B to charge the EV 108A. For example, the remote server 150B may broadcast a request to ACVs within a threshold distance of the EV 108A and/or may receive responses from a subset of the ACVs that are within the threshold distance of the EV 108A.

The remote server 150B may then select one of the ACVs to charge the EV 108A. For example, the remote server 150B may select an ACV configured to charge the EV 108A while both the ACV and the EV 108A are moving. Additionally, the remote server 150B may select the closest ACV to the EV 108A, the ACV closest to the EV's 108A route, the ACV with the highest battery power remaining, etc. In other implementations, the remote server 150B may select the ACV based upon any suitable combination of the distance from the ACV to the EV 108A, the distance from the ACV to a waypoint on the EV's 108A route, the amount of battery power remaining, etc.

As mentioned above, the remote server 150B may obtain the locations of the EV 108A and the ACV 140B (block 806), and/or determine a coupling location for the ACV 140B to attach to the EV 108A and begin charging the EV 108A as the EV 108A is moving (block 808). The remote server 150B may determine the coupling location based upon the locations of the EV 108A and the ACV 140B. For example, the remote server 150B may determine the coupling location as the current location of the EV 108A. In other implementations, the remote server 150B may determine the coupling location as a location on the EV's 108A route. In yet other implementations, the remote server 150B may determine a coupling location that minimizes the total distance the EV 108A and the ACV 140B have to travel to reach the coupling location.

The remote server 150B may determine the coupling location based upon any suitable combination of the location of the EV 108A, waypoints on the EV's 108A route, the location of the ACV 140B, the midpoint between the location of the EV 108A and the location of the ACV 140B, and/or the maximum distance that the EV 108A can travel before running out of power.

In some implementations, the EV 108A and the ACV 140B may transmit their respective locations directly to each other via V2V communication. Then the EV 108A and/or the ACV 140B may determine the coupling location based upon the respective locations received via the V2V communication.

At block 810, the remote server 150B may automatically dispatch the ACV 140B to the coupling location. In other implementations, the ACV 140B may automatically dispatch itself to the coupling location. The EV 108A may also travel to the coupling location.

Upon arriving at the coupling location, the ACV 140B may attach to the EV 108A. For example, the EV 108A may have a magnet attached to an external surface of the EV 108A, such as the back of the EV 108A. The ACV 140B may also have a magnet attached to an external surface of the ACV 140B, such as the front of the ACV 140B. The magnets may have the opposite polarity so that they will be attracted to each other. The ACV 140B may then attach to the EV 108A via electromagnetic attraction from the magnets.

In other implementations, the ACV 140B and/or the EV 108A may be layered with a magnetic coating or may include magnetic materials to attach to each other. The magnets may be permanent magnets or electromagnets. In embodiments where the magnets are electromagnets, the EV 108A and/or the ACV 140B may send a control signal to energize the magnet for the EV 108A and/or the ACV 140B, respectively. To detach from the EV 108A, the ACV 140B may stop sending an electric signal to the magnet for the ACV 140B to de-energize the magnet. Then the magnet may no longer attach to the magnet for the EV 108A.

Additionally, the EV 108A and the ACV 140B may communicate speed data with each other so that both vehicles travel at the same or a similar speed as they attach to each other. In other implementations, the EV 108A and the ACV 140B may stop moving momentarily while the ACV 140B attaches to the EV 108A. Then the EV 108A and/or the ACV 140B may begin moving once the ACV 140B has attached to the EV 108A. For example, the ACV 140B may begin moving and may tow (e.g., push or pull) the EV 108A. In other implementations, the EV 108A may begin moving and may pull the ACV 140B along.

In any event, at block 812, the remote server 150B may cause the ACV 140B to deliver electrical power to the EV 108A for a threshold charging period, where the ACV 140B and the EV 108A are each moving during at least a portion of the threshold charging period. For example, the remote server 150B may transmit an instruction to the ACV 140B to deliver electrical power to the EV 108A. In other implementations, the ACV 140B delivers electrical power to the EV 108A on its own without receiving an instruction from the remote server 150B. The ACV 140B may deliver the electrical power to the EV 108A wirelessly as the ACV 140B and the EV 108A travel to the destination.

To wirelessly provide electrical power to the EV 108A, the ACV 140B may transmit a communication signal via a radio link (e.g., a near field communication (NFC) link) to the EV 108A to inductively charge the EV 108A. The ACV 140B may include an antenna having a transmit coil and the EV 108A may include an antenna having a receive coil. The transmit and receive coils may induce a magnetic field to transfer power from the ACV 140B to the EV 108A. In some implementations, the ACV 140B may transfer power to the EV 108A until the EV 108A has enough power to reach the destination and/or a charging station. In other implementations, the ACV 140B may transfer power to the EV 108A until the EV 108A is fully charged and/or until the EV 108A arrives at the destination.

As noted elsewhere herein, in some embodiments, the EV information, including battery health and usage information, and any payment data, such as generated from V2V wireless communication and payment, may be stored on one or more blockchains or distributed ledgers.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112 (f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for charging an electric vehicle (EV) while the EV is moving, comprising:
   obtaining, by one or more processors, a request to deliver electrical power to the EV;
   selecting, by the one or more processors, an autonomous charging vehicle (ACV) of a plurality of ACVs to charge the EV having a highest battery power remaining of each of the plurality of ACVs, wherein the selected ACV is configured to charge the EV while the EV and the selected ACV are each moving;
   dispatching, by the one or more processors, the selected ACV to a coupling location; and
   causing, by the one or more processors, the selected ACV to deliver the electrical power to the EV for a threshold charging period, wherein the selected ACV and the EV are each moving during at least a portion of the threshold charging period.

2. The computer-implemented method of claim 1, further comprising:
   causing, by the one or more processors, a prompt to be displayed to a vehicle occupant requesting input from the vehicle occupant regarding whether to dispatch the selected ACV.

3. The computer-implemented method of claim 1, wherein:
   the selected ACV is dispatched automatically.

4. The computer-implemented method of claim 1, wherein:
   the selected ACV delivers the electrical power to the EV wirelessly.

5. The computer-implemented method of claim 4, wherein:
   the selected ACV is configured to deliver the electrical power to the EV using a magnet system.

6. The computer-implemented method of claim 1, wherein the selected ACV is a drone.

7. The computer-implemented method of claim 1, wherein:
   the selected ACV is a tow truck; and the selected ACV delivers electrical power to the EV while towing the EV.

8. A computer system for charging an electric vehicle (EV), comprising:

one or more processors;

a non-transitory computer-readable memory coupled to the one or more processors and storing executable instructions that, when executed by the one or more processors, cause the one or more processors to:

obtain a request to deliver electrical power to the EV;

select an autonomous charging vehicle (ACV) of a plurality of ACVs to charge the EV having a highest battery power remaining of each of the plurality of ACVs, wherein the selected ACV is configured to charge the EV while the EV and the selected ACV are each moving;

dispatch the selected ACV to a coupling location; and cause the selected ACV to deliver the electrical power to the EV for a threshold charging period, wherein the selected ACV and the EV are each moving during at least a portion of the threshold charging period.

9. The computer system of claim 8, wherein the executable instructions further cause the one or more processors to:

cause a prompt to be displayed to a vehicle occupant requesting input from the vehicle occupant regarding whether to dispatch the selected ACV.

10. The computer system of claim 8, wherein:

the selected ACV is dispatched automatically.

11. The computer system of claim 8, wherein:

the selected ACV delivers the electrical power to the EV wirelessly.

12. The computer system of claim 11, wherein:

the selected ACV is configured to deliver the electrical power to the EV using a magnet system.

13. The computer system of claim 8, wherein the selected ACV is a drone.

14. The computer system of claim 8, wherein:

the selected ACV is a tow truck; and the selected ACV delivers electrical power to the EV while towing the EV.

15. A tangible, non-transitory computer-readable medium storing executable instructions for charging an electric vehicle (EV) that, when executed by one or more processors, cause the one or more processors to:

obtain a request to deliver electrical power to the EV;

select an autonomous charging vehicle (ACV) of a plurality of ACVs to charge the EV having a highest battery power remaining of each of the plurality of ACVs, wherein the selected ACV is configured to charge the EV while the EV and the selected ACV are each moving;

dispatch the selected ACV to a coupling location; and cause the selected ACV to deliver the electrical power to the EV for a threshold charging period, wherein the selected ACV and the EV are each moving during at least a portion of the threshold charging period.

16. The tangible, non-transitory computer-readable medium of claim 15, wherein the executable instructions further cause the one or more processors to:

cause a prompt to be displayed to a vehicle occupant requesting input from the vehicle occupant regarding whether to dispatch the selected ACV.

17. The tangible, non-transitory computer-readable medium of claim 15, wherein:

the selected ACV is dispatched automatically.

18. The tangible, non-transitory computer-readable medium of claim 15, wherein:

the selected ACV delivers the electrical power to the EV wirelessly.

19. The tangible, non-transitory computer-readable medium of claim 15, wherein the selected ACV is a drone.

20. The tangible, non-transitory computer-readable medium of claim 15, wherein:

the selected ACV is a tow truck; and the selected ACV delivers electrical power to the EV while towing the EV.

* * * * *